United States Patent
Ono et al.

(10) Patent No.: US 6,567,832 B1
(45) Date of Patent: May 20, 2003

(54) DEVICE, METHOD, AND STORAGE MEDIUM FOR EXPONENTIATION AND ELLIPTIC CURVE EXPONENTIATION

(75) Inventors: Takatoshi Ono, Aichi-ken (JP); Natsume Matsuzaki, Minou (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/523,486

(22) Filed: Mar. 10, 2000

(30) Foreign Application Priority Data

Mar. 15, 1999 (JP) .................................. 11-069104

(51) Int. Cl.[7] .............................................. G06F 7/38
(52) U.S. Cl. ....................................................... 708/606
(58) Field of Search ................................ 708/606, 517, 708/491, 492, 277, 605, 512, 650; 380/1, 28

(56) References Cited

U.S. PATENT DOCUMENTS

| | | | | |
|---|---|---|---|---|
| 5,041,999 A | * | 8/1991 | Nakayama | 708/277 |
| 5,553,012 A | * | 9/1996 | Buss et al. | 341/75 |
| 5,600,581 A | * | 2/1997 | Dworkin et al. | 341/75 |
| 6,038,318 A | * | 3/2000 | Roden | 380/30 |
| 6,282,290 B1 | * | 8/2001 | Powell et al. | 380/260 |
| 6,298,135 B1 | * | 10/2001 | Messerges et al. | 380/1 |
| 6,304,889 B1 | * | 10/2001 | Ehrman | 708/606 |

FOREIGN PATENT DOCUMENTS

JP             749769          2/1995

OTHER PUBLICATIONS

Inoue et al., Logarithmic Arithmetic Unit Avoiding Division as Far as Predetermined Arithmetic Precision is Guaranteed, Nov. 2001, United States Patent Application Publication No. U.S. 2001/0044815 A1.*

* cited by examiner

Primary Examiner—Chuong Dinh Ngo
Assistant Examiner—Chat C. Do

(57) ABSTRACT

An exponent preprocessing unit preprocesses an n-bit exponent k and exponentiates a base A by the preprocessed exponent k. A bit string storing unit stores a bit string including a sign bit and the exponent k. A reading unit reads a bit pattern composed of the sign bit and a bit sequence made up of a predetermined number of bits. A bit pattern generating unit generates a new bit pattern from the read bit pattern. An operation pattern specifying unit specifies an operation pattern based on the read bit pattern. An operating unit performs an operation according to the specified operation pattern and writes the new bit pattern over the previous bit pattern. The reading unit reads a next bit sequence starting from a different bit in the bit string storing unit. A repeat controlling unit repeats these procedures n+1 times.

38 Claims, 16 Drawing Sheets

$A^k \bmod p$

FIG. 7

| n=32, k=4204957639=(11111010101000101000111111000111)$_2$ ||||| 
|---|---|---|---|---|
| ROUND | (n+2)-BIT HOLDING REGISTER | TRANSFORMATION OF HIGHER ORDER 4 BITS | MULTIPLICATION | INTERMEDIATE VALUE REGISTER |
|  |  |  |  | x=1 |
| 1 | 0011111010101000101000111111000111 | 1001 | ×A | x=x$^2$×  A=A |
| 2 | 1011111010101000101000111111000111 0 | - | - | x=x$^2$   =A$^2$ |
| 3 | 1111101010100010100011111100011100 | - | - | x=x$^2$   =A$^4$ |
| 4 | 1111010101000101000111111000111000 | - | - | x=x$^2$   =A$^8$ |
| 5 | 1110101010001010001111110001110000 | - | - | x=x$^2$   =A$^{16}$ |
| 6 | 1101010100010100011111100011100000 | 010- | ×A$^{-1}$ | x=x$^2$×  A=A$^{31}$ |
| 7 | 0010101000101000111111000111000000 | - | - | x=x$^2$   =A$^{62}$ |
| 8 | 0101010001010001111110001110000000 | - | ×A | x=x$^2$×  A=A$^{125}$ |
| 9 | 0010100010100011111100011100000000 | - | - | x=x$^2$   =A$^{250}$ |
| 10 | 0101000101000111111000111000000000 | - | ×A | x=x$^2$×  A=A$^{501}$ |
| 11 | 0010001010001111110001110000000000 | - | - | x=x$^2$   =A$^{1002}$ |
| 12 | 0100010100011111100011100000000000 | - | ×A | x=x$^2$×  A=A$^{2005}$ |
| 13 | 0000101000111111000111000000000000 | - | - | x=x$^2$   =A$^{4010}$ |
| 14 | 0001010001111110001110000000000000 | - | - | x=x$^2$   =A$^{8020}$ |
| 15 | 0010100011111100011100000000000000 | - | - | x=x$^2$   =A$^{16040}$ |
| 16 | 0101000111111000111000000000000000 | - | ×A | x=x$^2$×  A=A$^{32081}$ |
| 17 | 0010001111110001110000000000000000 | - | - | x=x$^2$   =A$^{64162}$ |
| 18 | 0100011111100011100000000000000000 | - | ×A | x=x$^2$×  A=A$^{128325}$ |
| 19 | 0000111111000111000000000000000000 | - | - | x=x$^2$   =A$^{256650}$ |
| 20 | 0001111110001110000000000000000000 | - | - | x=x$^2$   =A$^{513300}$ |
| 21 | 0011111100011100000000000000000000 | 1001 | ×A | x=x$^2$×  A=A$^{1026601}$ |
| 22 | 1011111000111000000000000000000000 | - | - | x=x$^2$   =A$^{2053202}$ |
| 23 | 1111110001110000000000000000000000 | - | - | x=x$^2$   =A$^{4106404}$ |
| 24 | 1111100011100000000000000000000000 | - | - | x=x$^2$   =A$^{8212808}$ |
| 25 | 1111000111000000000000000000000000 | - | - | x=x$^2$   =A$^{16425616}$ |
| 26 | 1110001110000000000000000000000000 | - | - | x=x$^2$   =A$^{32851232}$ |
| 27 | 1100011100000000000000000000000000 | 010- | ×A$^{-1}$ | x=x$^2$×  A=A$^{65702463}$ |
| 28 | 0000111000000000000000000000000000 | - | - | x=x$^2$   =A$^{131404926}$ |
| 29 | 0001110000000000000000000000000000 | - | - | x=x$^2$   =A$^{262809852}$ |
| 30 | 0011100000000000000000000000000000 | 1001 | ×A | x=x$^2$×  A=A$^{525619705}$ |
| 31 | 1011000000000000000000000000000000 | - | - | x=x$^2$   =A$^{1051239410}$ |
| 32 | 1110000000000000000000000000000000 | - | - | x=x$^2$   =A$^{2102478820}$ |
| 33 | 1100000000000000000000000000000000 | 010- | ×A$^{-1}$ | x=x$^2$×  A=A$^{4204957639}$ |

FIG. 8     PRIOR ART

| INITIAL VALUE | $x=1$ |
|---|---|
| FIRST BIT | $x \leftarrow x^2$<br>$x \leftarrow x \times A$ |
| SECOND BIT | $x \leftarrow x^2$ |
| THIRD BIT | $x \leftarrow x^2$<br>$x \leftarrow x \times A$ |
| FORTH BIT | $x \leftarrow x^2$<br>$x \leftarrow x \times A$ |

$A^k \bmod p$ $A^k \bmod p$

TO CONTROL SELECTORS IN OPERATING UNIT

FIG. 17 PRIOR ART

| HIGHER ORDER 3 BITS OF k | FIRST OPERATION | SECOND OPERATION |
|---|---|---|
| 000 | NO MULTIPLICATION | NO MULTIPLICATION |
| 001 | NO MULTIPLICATION | MULTIPLICATION BY A |
| 010 | NO MULTIPLICATION | MULTIPLICATION BY A |
| 011 | MULTIPLICATION BY A | NO MULTIPLICATION |
| 100 | MULTIPLICATION BY $A^{-1}$ | NO MULTIPLICATION |
| 101 | NO MULTIPLICATION | MULTIPLICATION BY $A^{-1}$ |
| 110 | NO MULTIPLICATION | MULTIPLICATION BY $A^{-1}$ |
| 111 | NO MULTIPLICATION | NO MULTIPLICATION |

DEVICE, METHOD, AND STORAGE MEDIUM FOR EXPONENTIATION AND ELLIPTIC CURVE EXPONENTIATION

This application is based on an application No. H11-069104 filed in Japan, the content of which is hereby incorporated by reference.

BACKGROUND OF THE INVENTION

1. Field of the Invention

The present invention relates to exponentiation techniques and elliptic curve exponentiation techniques for use in areas such as cryptography.

2. Description of the Prior Art

Cryptographic communications allow specific terminals to securely communicate with each other in a network coupled to a plurality of terminals. One of cryptographic systems used for such cryptographic communications is the so-called public key cryptosystem. Examples of public key cryptosystems are the RSA (Rivest-Shamir-Adelman) and ElGamal systems. These public key cryptosystems perform exponentiation in encryption or decryption processing, in such a way as to exponentiate a message by an encryption key or exponentiate a ciphertext by a decryption key.

Another type of public key cryptosystems is a cryptosystem that uses elliptic curves. While other public key cryptosystems take a finite field as the domain of definition, the elliptic curve cryptosystem takes an elliptic curve as the domain of definition and performs elliptic curve exponentiation in encryption or decryption processing.

It is to be noted that exponentiation and elliptic curve exponentiation are used not only in the public key cryptosystems but in digital signature and message authentication schemes.

Knuth's binary method (see D. E. Knuth "Seminumerical Algorithms" *The Art of Computer Programming*, vol. 2 (1981)) is widely known as an algorithm for exponentiation and elliptic curve exponentiation. Also, the signed binary method (see F. Morain & J. Olivos "Speeding up the Computations on an Elliptic Curve using Addition-Subtraction Chains" *Theoretical Informatics and Applications*, vol. 24, no.6 (1990)) and the small window method (see the same document by Knuth) are known as improvements to the binary method. Further, Japanese Laid-Open Patent Application No. H07-049769 devises an improved signed binary method.

These conventional techniques are outlined below, taking modular exponentiation as an example.

(Binary Method)

The binary method, when given a binary representation $ki(n>i\geq 0)$ (where ki takes 0 or 1) of some exponent k, performs n−1 modular squarings and a number of modular multiplications equivalent to a number of ones in ki, to obtain a modular exponentiation value.

Let the binary representation $ki(4>i\geq 0))=1011$. The binary method computes an exponentiation $A^{1011}$ using arithmetic expressions given in FIG. 8.

First, 1 is assigned to x as an initial value. The most significant bit (MSB) of the exponent is interpreted as the first bit. If the first bit is 1, an operation of squaring x and setting $x^2$ as x and an operation of multiplying x by A are performed in sequence. If the first bit is 0, only an operation of squaring x and setting $x^2$ as x is performed. The same is repeated for each of the other bits of lesser significance. Consequently, x obtained after the least significant bit (LSB) has been processed is the exponentiation value $A^{1011}$.

FIG. 9 is a flowchart showing the procedure of the binary method. In descending order from i=n−1, the value of ki is checked (S71 and S76). If and only if ki=1 (S74), a modular multiplication is performed (S75). Meanwhile, a modular squaring is performed regardless of whether ki is 1 or 0 (S73). For a randomly chosen exponent k, this method takes n/2 modular multiplications on average. Also, since the exponent k is expressed in the ordinary binary representation, the method requires a storage of n bits for the exponent k.

FIG. 4 is a block diagram showing the general construction of a modular exponentiation device that carries out the above modular exponentiation.

In the figure, an exponent processing unit 101 processes an exponent k and also controls an exponentiation operation in an operating unit 106. Once the exponent k of n bits has been inputted in the modular exponentiation device through an input line 102, the exponent processing unit 101 accepts the exponent k as an initial value and processes the exponent k. The exponent processing unit 101 then outputs a control signal via an output line 103 to the operating unit 106, to control the exponentiation operation in the operating unit 106. In the meantime, a base A to be exponentiated by the exponent k is inputted in the modular exponentiation device via an input line 104 and received by the operating unit 106. The operating unit 106 performs the exponentiation operation, including modular squarings and modular multiplications, modulo a prime p for the base A, in accordance with the control signal. As a result, a modular exponentiation value $A^k \bmod p$ is obtained and outputted from the operating unit 106 via an output line 105. Here, the prime p which acts as the modulus has been retained in the modular exponentiation device beforehand.

FIG. 10 is a block diagram showing the detailed construction of the exponent processing unit 101.

In the figure, a holding register 601 has an n-bit storage for holding the exponent k. The exponent k inputted in the modular exponentiation device is passed through an input line 602 to the holding register 601 as the initial value. A shifting unit 605 shifts the content of the holding register 601 by 1 bit to the left, as a result of which the MSB is shifted out and abandoned. This MSB is outputted from the holding register 601 via an output line 606 to the operating unit 106 as the control signal, according to which the processing content of the operating unit 106 is determined.

FIG. 11 is a block diagram showing the detailed construction of the operating unit 106. An intermediate value register 701 holds an intermediate value generated during the exponentiation operation. A constant 1 is inputted via an input line 702 into the intermediate value register 701 as an initial value. A squaring unit 703 performs a modular squaring on the intermediate value held in the intermediate value register 701 and outputs the result. A multiplying unit 704 performs a modular multiplication on the output of the squaring unit 703 by the base A and outputs the result. A selector 707 selects a new intermediate value to be stored in the intermediate value register 701, according to the control signal given from the exponent processing unit 101. If the control signal is 0, the selector 707 selects the output of the squaring unit 703, whereas if the control signal is 1, the selector 707 selects the output of the multiplying unit 704. After the above procedure is repeated for all n bits of the exponent k, $A^k \bmod p$ is outputted through an output line 708.

(Signed Binary Method)

The signed binary method, when given a binary representation $ki(n>i\geq 0)$ (where ki takes 0 or 1) of some exponent k, transforms ki into a signed binary representation k'i(n≧i≧0) (where k'i takes 0, 1, or −1), and performs n modular squarings and a number of modular multiplications equivalent to a number of ones and minus ones in k'i, to obtain a modular exponentiation value. For instance, letting the binary representation ki(4>i≧0)=1111, then the signed binary representation is k'i(4≧i≧0))=1000(−1). Thus, when ki has a large number of consecutive ones, k'i will end up having a large number of zeros, thereby reducing the number of modular multiplications by the increase of zeros.

FIG. 12 is a flowchart showing the procedure of the signed binary method. In the figure, steps S101~S106 constitute the process of transforming a binary representation ki into a signed binary representation k'i, and steps S107~S114 constitute the process of applying the binary algorithm to the signed binary representation k'i. The latter process is analogous to the original binary method described above.

To transform the binary representation ki into the signed binary representation k'i, first the value of ki is checked in ascending order from i=0 (S101, S103, and S105). When ki=1 and k[i+1]=1, k'i is set to −1 and 1 is added to k[i+1] with a carry being taken into account (S104). Otherwise, k'i is set to ki (S106). Due to the addition with carry, when the number of digits of ki is n, the number of digits of k'i is n +1. Next, the value of k'i is checked in descending order from i=n (S107, S110, and S113). If k'i=1, a modular multiplication is performed (S111), while if k'i=−1, the inverse of a modular multiplication is performed (S112). Meanwhile, a modular squaring is performed regardless of whether k'i is 1, 0, or −1, as with the original binary method (S109).

The signed binary method takes n/3 modular multiplications on average, for a randomly chosen exponent k. On the other hand, representing the exponent k by a signed binary number needs two bits per digit (in order to represent three values 0, 1, and −1), so that the method requires a storage of 2(n+1) bits in total, for the exponent k.

FIG. 13 is a block diagram showing the construction of an exponent processing unit equipped in a modular exponentiation device that adopts the signed binary method. A holding register 901 has a storage of 2(n+1) bits to retain an exponent k in signed binary representation. A signed binary representation of the n-bit exponent k generated by a signed binary representation transforming unit 907 is inputted in the holding register 901 via an input line 902, as an initial value. The signed binary representation transforming unit 907 transforms the binary representation of n digits into the signed binary representation of n+1 digits, in accordance with the procedure shown in FIG. 12. A shifting unit 905 shifts the content of the holding register 901 by 2 bits to the left. This left shift of 2 bits is because each digit is represented by 2 bits in signed binary representation. Here, the higher order 2 bits are shifted out and as a result abandoned. The higher order 2 bits are then outputted from the holding register 901 via an output line 906 to an operating unit as a control signal, according to which the processing content of the operating unit is determined.

FIG. 14 is a block diagram showing the construction of the operating unit equipped in the modular exponentiation device that adopts the signed binary method. An intermediate value register 1001 holds an intermediate value generated during the exponentiation operation. A constant 1 is inputted in the intermediate value register 1001 through an input line 1002 as an initial value. A squaring unit 1003 performs a modular squaring on the intermediate value in the intermediate value register 1001 and outputs the result. A multiplying unit 1004 performs a modular multiplication on the output of the squaring unit 1003 by a base A or by the multiplicative inverse of A and outputs the result. A multiplicative inverse acquiring unit 1005 outputs the multiplicative inverse of A. A selector 1006 selects either the base A or the multiplicative inverse of A as a value to be inputted in the multiplying unit 1004, in accordance with the control signal given from the exponent processing unit. A selector 1007 selects a new intermediate value to be stored in the intermediate value register 1001, in accordance with the control signal given from the exponent processing unit. When the control signal is 00, the selector 1007 selects the output of the squaring unit 1003 as the new intermediate value. Otherwise, the selector 1007 selects the output of the multiplying unit 1004 as the new intermediate value. Once the above procedure has been done for all bits of the exponent k, $A^k$ mod p is outputted through an output line 1008.

(Improved Signed Binary Method)

The improved signed binary method disclosed in Japanese Laid-Open Patent Application No. H07-049769, when given a binary representation ki(n>i24 0) (where ki takes 0 or 1) of an exponent k, performs operations such as modular multiplications while transforming the binary representation ki into a signed binary representation, to obtain a modular exponentiation value. Whereas the above signed binary method is batch processing that cannot launch the exponentiation operation until all bits of the exponent k are transformed, the improved signed binary method can conduct the exponentiation operation while the transformation is in progress.

FIG. 15 is a flowchart showing the procedure of the improved signed binary method. The value of ki is checked in units of 3 bits in descending order from i=n−1 (S133), as a result of which 2 of the 3 bits are transformed into signed binary representation and operations such as modular multiplications are performed. This method takes 3n/8 modular multiplications on average for a randomly chosen exponent k. Also, since the signed binary transformation and the modular exponentiation operation are carried out in parallel, the method requires only a storage of n bits for the exponent k.

FIG. 16 is a block diagram showing the construction of an exponent processing unit equipped in a modular exponentiation device that employs the improved signed binary method. A holding register 1201 has a capacity of n+2 bits and holds an exponent k in signed binary representation. The n-bit exponent k is inputted in the holding register 1201 via an input line 1202 as an initial value. A judging unit 1203 judges a bit pattern of the higher order 3 bits in the holding register 1201. A shifting unit 1205 shifts the content of the holding register 1201 by 2 bits to the left. This left shift of 2 bits is because a control signal to control two operations in an operating unit is generated in one judgement process. Here, the higher order 2 bits are shifted out and as a result abandoned. The control signal showing the judgement result is outputted from the judging unit 1203 to the operating unit through an output line 1206, to determine the processing content of the operating unit.

FIG. 2 is a block diagram showing the construction of the operating unit equipped in the modular exponentiation device that employs the improved signed binary method. An intermediate value register 301 holds an intermediate value generated during the exponentiation operation. A constant 1 is inputted in the intermediate value register 301 via an input line 302 as an initial value. A squaring unit 303 performs a modular squaring on the intermediate value in the intermediate value register 301 and outputs the result. A multiplying unit 304 performs a modular multiplication on the output of the squaring unit 303 by a base A or by the multiplicative inverse of A and outputs the result. A multiplicative inverse acquiring unit 305 outputs the multiplicative inverse of A. A selector 306 selects either the base A or the multiplicative inverse of A as a value to be inputted in the multiplying unit 304, according to the control signal given from the exponent processing unit. A selector 307 selects either the output of the squaring unit 303 or the output of the multiplying unit 304 as a new intermediate value to be stored in the intermediate value register 301, according to the control signal given from the exponent processing unit. After the above procedure is repeated for every bit of the exponent k, $A^k$ mod p is outputted through an output line 308.

FIG. 17 shows a table, referenced by the judging unit 1203 in the exponent processing unit, that associates bit patterns of the higher order 3 bits with patterns of first and second operations to be performed by the operating unit. A column 1301 shows the bit pattern of the higher order 3 bits, whereas a column 1303 shows the operation pattern to be applied by the operating unit. When "multiplication by A" is indicated, the selector 306 in the operating unit selects the base A as the value to be inputted in the multiplying unit 304, and the selector 307 selects the output of the multiplying unit 304 as the new intermediate value. When "multiplication by $A^{-1}$" is indicated, the selector 306 selects the multiplicative inverse of A as the input value of the multiplying unit 304, and the selector 307 selects the output of the multiplying unit 304 as the new intermediate value. When "no multiplication" is indicated, on the other hand, the selector 307 selects the output of the squaring unit 303 as the new intermediate value. Likewise, a column 1304 in the table shows the operation pattern to be applied by the operating unit in a loop following the first operation in the column 1303. Thus, one judgement process by the judging unit 1203 in the exponent processing unit allows the contents of two operations by the operating unit to be determined.

However, the original binary method takes a squaring for every bit of an exponent and a multiplication by A for every zero bit. This means that 1.5 operations per bit are required on average. Thus, a large amount of computation is needed in the binary method.

The signed binary method can reduce the amount of computation of the original binary method. However, storing an exponent in signed binary representation costs a storage at least twice as large as that of the binary method.

Likewise, the small window method, though its explanation has been omitted, can further reduce the amount of computation of the binary method but requires a still larger storage for the exponent.

The improved signed binary method can reduce the average amount of computation to approximately that of the signed binary method, without the size of the exponent storage of the original binary method being increased. Nevertheless, the performance of the improved signed binary method is poor for a specific bit pattern, such as 0010, of an exponent. The original binary method takes only one modular multiplication for the bit pattern 0010, since the number of modular multiplications needed is equal to the number of one bits. In comparison, the improved signed binary method takes two modular multiplications for the same bit pattern, as can be seen from the table in FIG. 17. This indicates that the improved signed binary method in the worst case requires double the number of modular multiplications of the original binary method.

It should be noted that, though the above problems concern exponentiation, the same holds true for elliptic curve exponentiation. Therefore, solutions to these problems are important in not only exponentiation but elliptic curve exponentiation, for the efficient implementation of public key cryptosystems.

SUMMARY OF THE INVENTION

The first object of the invention is to provide an exponentiation device that can limit the number of multiplications in exponentiation to approximately that of the signed binary method on average and to that of the original binary method in the worst case, while maintaining the size of the exponent storage close to that of the original binary method.

The second object of the invention is to provide an exponent preprocessing unit improved to reduce the number of multiplications, in an exponentiation device that preprocesses an exponent and performs exponentiation with the preprocessed exponent.

The third object of the invention is to provide an exponentiation method for use in an exponentiation device, that can reduce the size of the exponent storage and the number of multiplications.

The fourth object of the invention is to provide a storage medium storing an exponentiation program for implementing the above exponentiation method.

The fifth object of the invention is to provide a modular exponentiation device, a modular exponentiation method, and a storage medium storing a modular exponentiation program that deliver the same advantages and effects as the above exponentiation device, exponentiation method, and storage medium storing the exponentiation program.

The sixth object of the invention is to provide an elliptic curve exponentiation device, an elliptic curve exponentiation method, and a storage medium storing an elliptic curve exponentiation program that deliver the same advantages and effects as the above exponentiation device, exponentiation method, and storage medium storing the exponentiation program.

The first and second objects can be fulfilled by an exponent preprocessing unit in an exponentiation device in which the exponent preprocessing unit preprocesses an n-bit exponent k and an operating unit exponentiates a base A by the preprocessed exponent k to compute $A^k$, the exponent preprocessing unit including: a bit string storing unit for storing a bit string including a sign bit and the exponent k; a reading unit for reading from the bit string storing unit a bit pattern composed of the sign bit and a bit sequence made up of a predetermined number of bits, the predetermined number being smaller than n; a bit pattern generating unit for generating a new bit pattern based on the bit pattern read by the reading unit; an operation pattern specifying unit for specifying an operation pattern to be applied to the base A, based on the read bit pattern; an instructing and changing unit for instructing the operating unit to perform an operation according to the operation pattern specified by the operation pattern specifying unit, and changing the read bit pattern to the new bit pattern and writing the new bit pattern back into the bit string storing unit in bit positions from which the bit pattern was read; a read position setting unit for having the reading unit read a next bit sequence starting from a different bit in the bit string in the bit string storing unit; and a repeat controlling unit for having the reading unit, the bit pattern generating unit, the operation pattern specifying unit, the instructing and changing unit, and the read position setting unit sequentially repeat respective procedures thereof n+1 times.

Here, the read position setting unit may upshift the bit string in the bit string storing unit excluding the sign bit, wherein the bit pattern read by the reading unit is composed of higher order 4 bits including the sign bit in the bit string storing unit.

Here, the bit pattern generating unit may have a table in which first bit patterns in a first column are associated with second bit patterns in a second column, wherein the bit pattern generating unit searches the first column for a first bit pattern that matches at least part of the bit pattern read by the reading unit, retrieves from the second column a second bit pattern which is associated with the first bit pattern, and sets the retrieved second bit pattern as the new bit pattern.

Here, the first bit patterns in the first column may be a 4-bit pattern 0011, a higher order 2-bit pattern 01, and a higher order 3-bit pattern 110, wherein the 4-bit pattern 0011 in the first column is associated with a 4-bit pattern 1001 in the second column, and the higher order 3-bit pattern 110 in the first column is associated with a higher order 3-bit pattern 010 in the second column, and wherein if neither the 4-bit pattern 0011 nor the higher order 3-bit pattern 110 in the first column matches at least part of the read bit pattern, the bit pattern generating unit sets the read bit pattern as the new bit pattern.

Here, the table may also include a third column that shows operation patterns which are associated with the first bit patterns in the first column, wherein if the first bit pattern that matches at least part of the read bit pattern is found, the operation pattern specifying unit specifies one of the operation patterns in the third column which is associated with the first bit pattern.

Here, the 4-bit pattern 0011 and the higher order 2-bit pattern 01 in the first column may be both associated with an operation pattern "multiplication by the base A" in the third column, and the higher order 3-bit pattern 110 in the first column may be associated with an operation pattern "multiplication by a multiplicative inverse of the base A" in the third column, wherein if the first bit pattern that matches at least part of the read bit pattern is not found, the operation pattern specifying unit specifies an operation pattern "no multiplication".

Here, the bit string storing unit may be a register of n+2 bits whose MSB (most significant bit) is the sign bit, and the read position setting unit may be a shifter for left shifting the bit string in the bit string storing unit excluding the MSB by 1 bit.

Here, the bit pattern generating unit may be provided with predetermined logical equations, to generate the new bit pattern by assigning to the logical equations values of the 4 bits which compose the read bit pattern.

Here, the logical equations in the bit pattern generating unit may be $$D_3 = \overline{B_2} \cdot B_1 \cdot B_0 + B_3 \cdot (\overline{B_2} + B_1)$$

$$D_2 = B_2$$

$$D_1 = B_1 \cdot (B_3 + B_2 + \overline{B_0})$$

$$D_0 = B_0$$

where $B_3$, $B_2$, $B_1$, and $B_0$ respectively denote the values of the 4 bits which compose the read bit pattern in descending order of significance, and $D_3$, $D_2$, $D_1$ and $D_0$ respectively denote values of 4 bits which compose the new bit pattern in descending order of significance.

Here, the operation pattern specifying unit may be provided with predetermined logical equations, to specify the operation pattern by assigning to the logical equations values of the 4 bits which compose the read bit pattern.

Here, the logical equations in the operation pattern specifying unit may be $$S_A = \overline{B_3} \cdot \overline{B_2} \cdot B_1 \cdot B_0 + \overline{B_3} \cdot B_2$$

$$S_{A-1} = B_3 \cdot B_2 \cdot \overline{B_1}$$

where $B_3$, $B_2$, $B_1$, and $B_0$ respectively denote the values of the 4 bits which compose the read bit pattern in descending order of significance, $S_A$ denotes a signal showing whether to perform a multiplication by the base A, and $S_{A-1}$ denotes a signal showing whether to perform a multiplication by the multiplicative inverse of the base A.

With the above construction, the size of the storage for the n-bit exponent can be limited to n+2 bits. In addition, since the content of the operation is determined using the signed binary representation of the exponent, the number of multiplications needed in exponentiation can be reduced to about the average number of multiplications (one-third of n) of the signed binary method.

Further, since the change in the signed binary representation is registered to the bit string storing unit so as to be used for the next judgement, the number of multiplications needed will never exceed the number of multiplications of the original binary method.

Thus, the number of multiplications can be limited to approximately that of the signed binary method without the size of the exponent storage of the original binary method being significantly increased.

The first object can also be fulfilled by an exponentiation device for computing $A^k$ using an n-bit positive integer k and an integer A, including: a storing unit having an exponent holding area of n+1 bits, a sign holding area for holding a sign, and an intermediate value holding area for holding an intermediate value generated during the computation of $A^k$; an initializing unit for initializing the storing unit by setting the integer k in lower order n bit positions in the exponent holding area, a value 0 in an MSB position in the exponent holding area, a positive sign + in the sign holding area, and a constant 1 in the intermediate value holding area; a squaring unit for squaring the intermediate value in the intermediate value holding area to obtain a square and replacing the intermediate value in the intermediate value holding area with the square to renew the intermediate value; a judgement object selecting unit for selecting the sign in the sign holding area and higher order 3 bits in the exponent holding area, as a judgement object; a judging unit for judging whether the judgement object has (a) a first pattern in which the sign in the sign holding area is the positive sign + and a bit pattern of the higher order 3 bits in the exponent holding area is 011, (b) a second pattern in which the sign in the sign holding area is the positive sign + and a higher order 1 bit in the exponent holding area is 1, (c) a third pattern in which the sign in the sign holding area is a negative sign – and a bit pattern of higher order 2 bits in the exponent holding area is 10, or (d) none of the first pattern, the second pattern, and the third pattern; a multiplying unit for (1) if the judgement object has any of the first pattern and the second pattern, multiplying the intermediate value in the intermediate value holding area by the integer A to obtain a product and replacing the intermediate value in the intermediate value holding area with the product to renew the intermediate value, (2) if the judgement object has the third pattern, multiplying the intermediate value in the intermediate value holding area by a multiplicative inverse of the integer A to obtain a product and replacing the intermediate value in the intermediate value holding area with the product to renew the intermediate value, and (3) if the judgement object has none of the first pattern, the second pattern, and the third pattern, maintaining the intermediate value in the intermediate value holding area intact without performing any operation; a first changing unit for changing the sign in the sign holding area to the negative sign − and the bit pattern of the higher order 3 bits in the exponent holding area to 001, if the judgement object has the first pattern; a second changing unit for changing the sign in the sign holding area to the positive sign +, if the judgement object has the third pattern; a shifting unit for left shifting a bit string of n+1 bits held in the exponent holding area by 1 bit and abandoning any bit that overflows, after procedures required depending on a judgement result by the judging unit are carried out; an outputting unit for outputting the intermediate value in the intermediate value holding area as $A^k$; and a controlling unit for firstly having the initializing unit initialize the storing unit, secondly having the squaring unit, the judgement object selecting unit, the judging unit, the multiplying unit, the first changing unit, the second changing unit, and the shifting unit sequentially repeat respective procedures thereof n+1 times, and lastly having the outputting unit output the intermediate value in the intermediate value holding area as $A^k$.

The modular exponentiation device of the fourth object and the elliptic curve exponentiation device of the fifth object have constructions same as or analogous to the exponentiation device. Accordingly, like the exponentiation device, the modular exponentiation device and the elliptic curve exponentiation device can reduce the number of multiplications needed, without having to significantly increase the size of the exponent storage.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 7 shows a table to explain the sequence of the modular exponentiation in the embodiment of the invention;

FIG. 8 shows arithmetic expressions used in the prior art binary method;

FIG. 17 shows a table, used in the prior art method disclosed in Japanese Laid-Open Patent Application No. H07-049769, that associates bit patterns of an exponent with patterns of first and second operations to be performed by an operating unit.

DESCRIPTION OF THE PREFERRED EMBODIMENT(S)

The following is a description of an embodiment of the present invention with reference to the figures.

Figure 4:
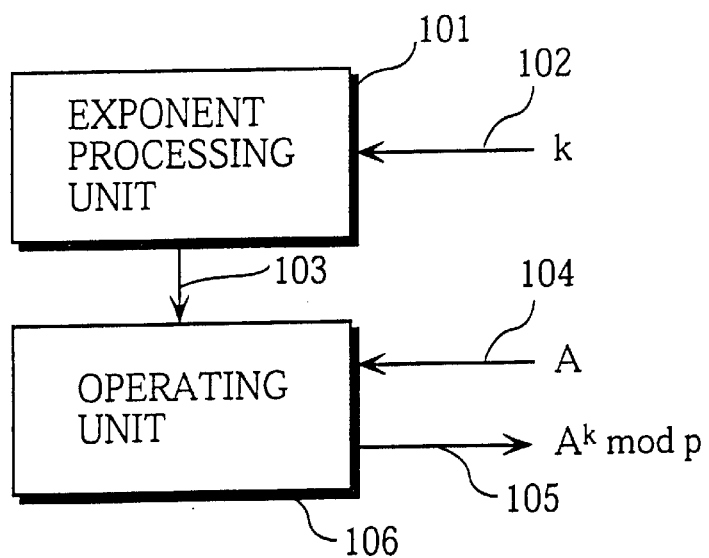
FIG. 4 shows the general construction of a modular exponentiation device.

A modular exponentiation device according to the embodiment of the invention has the construction shown in FIG. 4. In this modular exponentiation device, an exponent processing unit 101 processes an exponent k (in binary representation) and outputs the processed exponent to an operating unit 106, and the operating unit 106 exponentiates a base A by the processed exponent modulo a prime p, thereby obtaining $A^k$ mod p.

Figure 1:
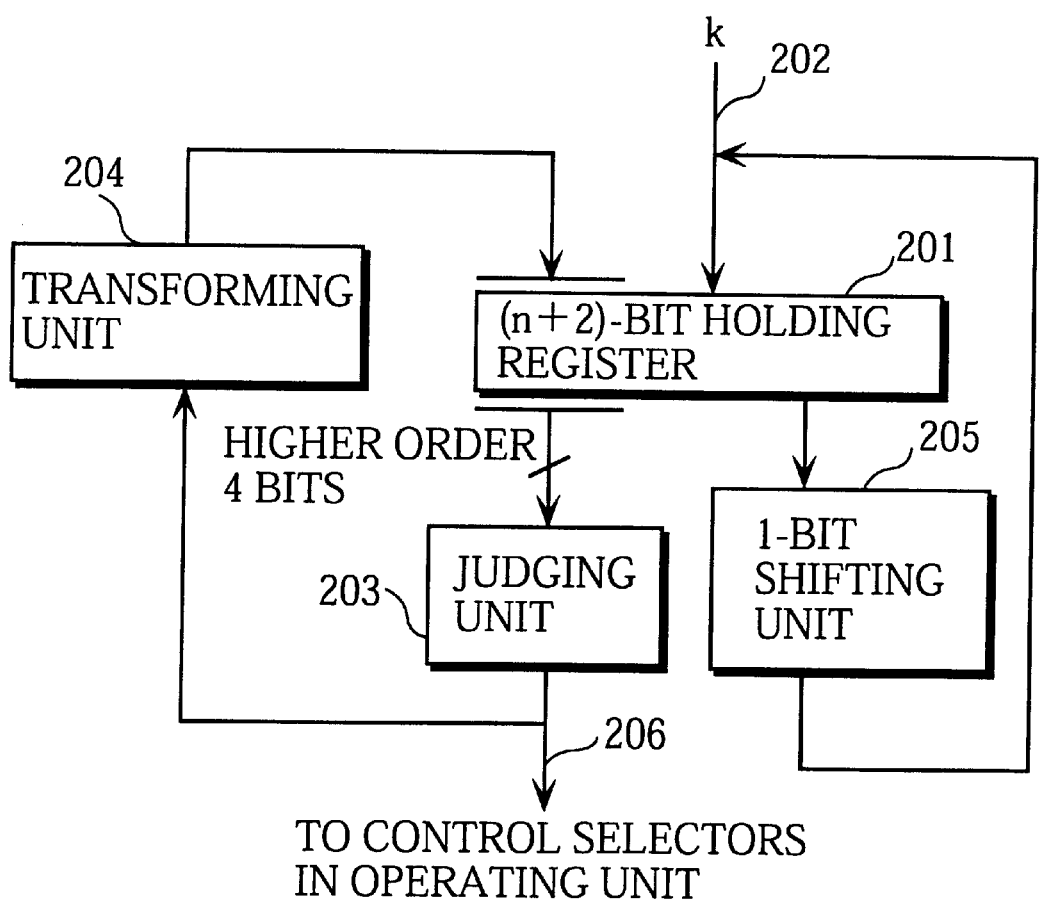
FIG. 1 shows the construction of an exponent processing unit in an embodiment of the invention.

FIG. 1 shows the detailed construction of the exponent processing unit 101 that constitutes the difference with the prior art techniques.

In the figure, a holding register 201 has a storage of n+2 bits, n being the bit length of the exponent k. The reason why 2 has been added to the exponent's bit length n is that one bit will be used as a sign bit and the other bit will be needed as a result of the exponent k being transformed into a signed binary representation. The exponent k is inputted in the holding register 201 through an input line 202 as an initial value. A judging unit 203 classifies a bit pattern of the higher order 4 bits in the holding register 201 under four types. A transforming unit 204 transforms the bit pattern of the higher order 4 bits depending on the classified type. A shifting unit 205 shifts the content of the holding register 201 excluding the MSB therein, by 1 bit to the left. Here, the MSB is retained as it is. A loop from the judging unit 203 to the transforming unit 204 and a loop of the shifting unit 205 are alternately executed. A control signal is outputted from the judging unit 203 to the operating unit 106 via an output line 206, to determine the processing content of the operating unit 106.

Figure 3:
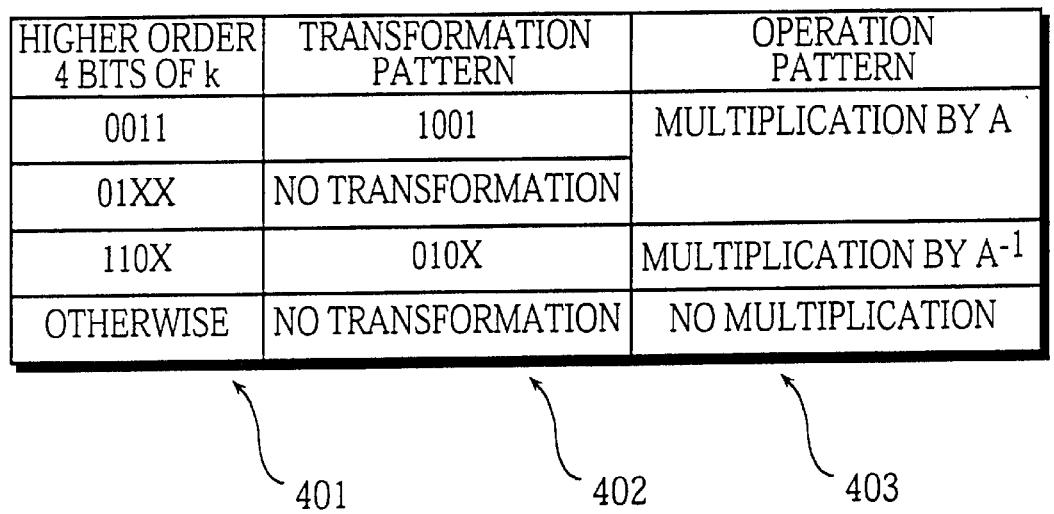
FIG. 3 shows a table, reference by a judging unit in the exponent processing unit, that associates bits patterns of the higher order 4 bits with transformation patterns and operation patterns.

FIG. 3 shows a table, reference by the judging unit 203, that associates bit patterns of the higher order 4 bits in the holding register 201 with transformation patterns to be applied by the transforming unit 204 and operation patterns to be applied by the operating unit 106. In the table, a column 401 shows the bit pattern of the higher order 4 bits in the holding register 201. A column 402 shows the transformation pattern to be applied by the transforming unit 204 for the bit pattern in the column 401. Here, "no transformation" indicates the higher order 4 bits will be unchanged. A column 403 shows the operation pattern to be applied by the operating unit 106 for the bit pattern in the column 401. As illustrated, there are three operation patterns that are "multiplication by A", "multiplication by $A^{-1}$", and "no multiplication".

The control signal showing the operation pattern specified by the judging unit 203 is outputted to the operating unit 106. The operating unit 106 of the embodiment has the construction shown in FIG. 2. Selectors 306 and 307 in the operating unit 106 are controlled in accordance with the control signal supplied by the exponent processing unit 101. When the control signal indicates "multiplication by A", the selector 306 selects the base A as a multiplier to be inputted in the multiplying unit 304 and the selector 307 selects the output of the multiplying unit 304 as a new intermediate value to be stored in the intermediate value register 301. When the control signal indicates "multiplication by $A^{-1}$", the selector 306 selects the output of the multiplicative inverse acquiring unit 305 as the multiplier in the multiplying unit 304 and the selector 307 selects the output of the multiplying unit 304 as the new intermediate value. When the control signal indicates "no multiplication", meanwhile, the selector 306 does not make any selection and the selector 307 selects the output of the squaring unit 303 as the new intermediate value.

Figure 2:
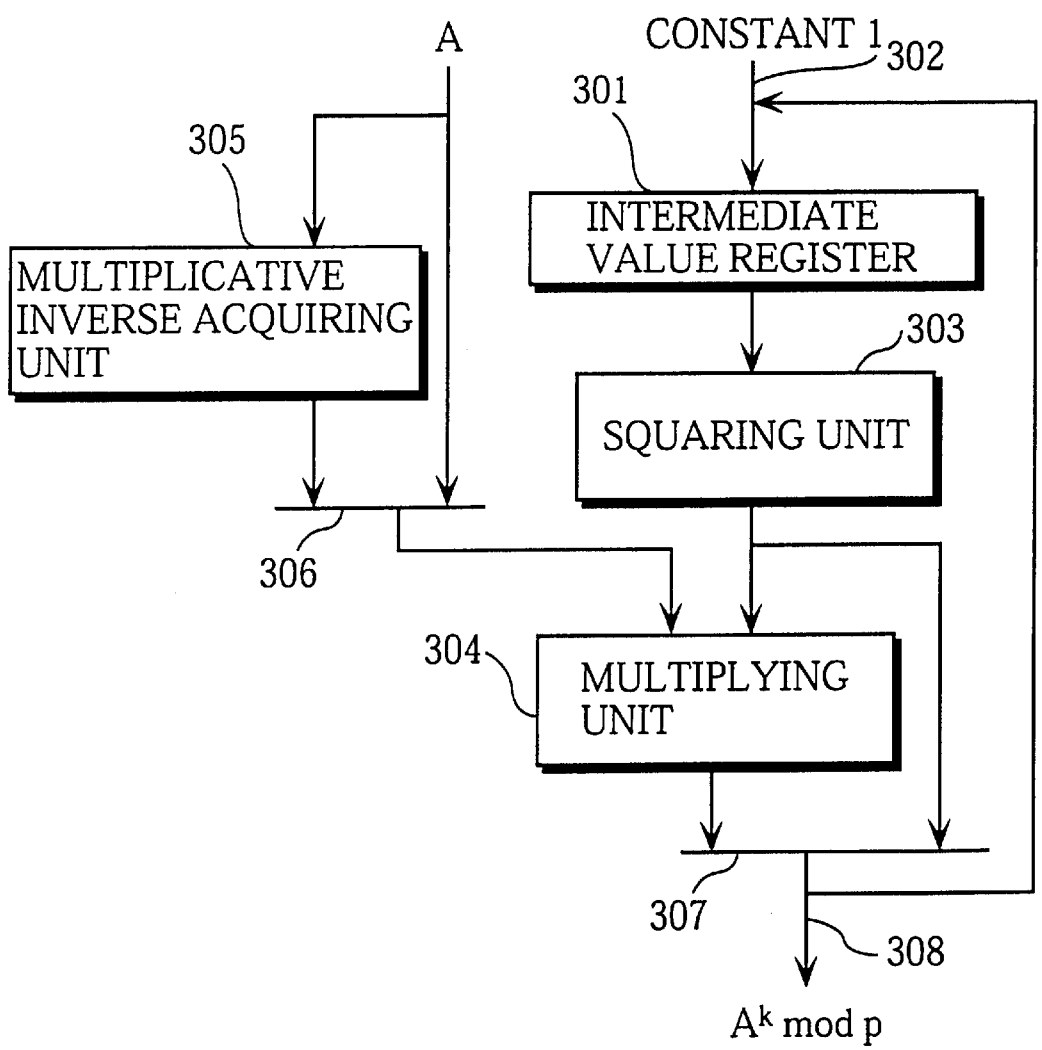
FIG. 2 shows the construction of an operating unit in the embodiment of the invention.
Figure 5:
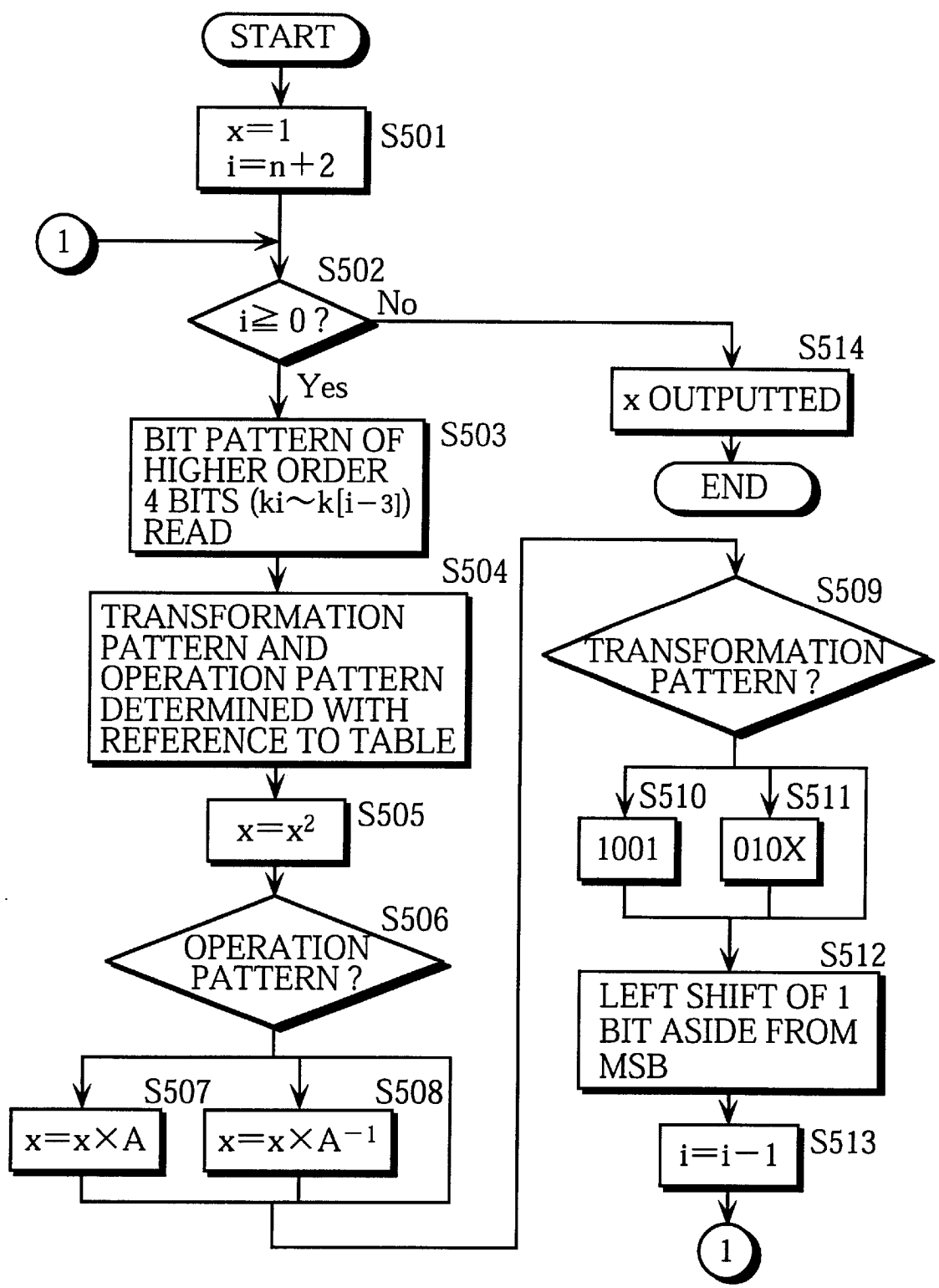
FIG. 5 is a flowchart showing the procedure of modular exponentiation in the embodiment of the invention.

FIG. 5 is a flowchart showing the procedure of the modular exponentiation device of the embodiment that includes the exponent processing unit 101 in FIG. 1 and the operating unit 106 in FIG. 2. The modular exponentiation device carries out modular exponentiation in the following manner.

Let k be an n-bit exponent such that k=4204957639=$(11111010101000101000111111000111)_2$, where n=32. Prior to the computation of $A^k$, the 32-bit exponent k is inputted in the holding register 201 in the exponent processing unit 101. Here, 0 is set in the remaining higher order 2 bit positions in the holding register 201, as a result of which the content of the holding register 201 forms an (n+2)-bit pattern shown in round 1 in a table in FIG. 7. This being so, x$32$ 1 and i=n+2 are given as initial values (S501), where x and i are variables and are stored in variable registers (not illustrated). Next, if i$\geq$0 (S502), a bit pattern of the higher order 4 bits (ki~k[i−3]) in the holding register 201 is read by the judging unit 203 (5503). Since the bit pattern of the higher order 4 bits is "0011" in round 1 in FIG. 7, the judging unit 203 refers to the table in FIG. 3 and obtains a transformation pattern "1001" and an operation pattern "multiplication by A" corresponding to the bit pattern "0011" (S504). In the operating unit 106, x=$x^2$ is computed by the squaring unit 303 (S505). Then, the selectors 306 and 307 are controlled by a control signal indicating the operation pattern "multiplication by A", as a result of which x=x×A is computed by the multiplying unit 304 (S506 and 5507). Since x=1 has been set as the initial value prior to round 1, x=A is consequently yielded and stored in the intermediate value register 301.

After this, the judging unit 203 passes the transformation pattern "1001" to the transforming unit 204, which accordingly transforms the higher order 4 bits in the holding register 201 into the bit pattern "1001" (S509 and S510). Following this, the shifting unit 205 shifts the content of the holding register 201 excluding the MSB by 1 bit to the left (5512). After i is decremented by 1 (S513), the procedure returns to step S502. At this point, the content of the holding register 201 has an (n+2)-bit pattern shown in round 2 in FIG. 7. A bit pattern of the higher order 4 bits in round 2 is "1011", so that the judging unit 203 obtains a transformation pattern "no transformation" and an operation pattern "no multiplication" with reference to the table in FIG. 3 (S503 and S504). According to the operation pattern "no multiplication",only x=$x^2$ is computed (S505). Since x=A in round 1 in FIG. 7, x=$A^2$ is consequently yielded and is stored in the intermediate value register 301. Meanwhile, according to the transformation pattern "no transformation", the transforming unit 204 performs no transformation on the higher order 4 bits in the holding register 201. The shifting unit 205 shifts the content of the holding register 201 except for the MSB by 1 bit to the left (S512), thereby rendering the content of the holding register 201 as that shown in round 3 in FIG. 7. After this, i is decremented by 1 (S513) and steps S502~S513 are repeatedly performed. In each round that follows, the (n+2)-bit pattern in the holding register 201 and the intermediate value x in the intermediate value register 302 change as shown in FIG. 7. Once i has become negative after being decremented n=2 times (S502), x, given rightmost in round 33 in FIG. 7, is outputted as an exponentiation value (S514) and the procedure ends.

In the above embodiment, the judging unit 203 has referenced the table in FIG. 3 to indicate a transformation pattern and an operation pattern respectively to the transforming unit 204 and the operating unit 106, based on a bit pattern of the higher order 4 bits in the holding register 201. However, an arithmetic circuit provided with predetermined logical equations may be substituted for such a table. For example, when $B_3B_2B_1B_0$ denotes a bit pattern of the higher order 4 bits read from the holding register 201 and $D_3D_2D_1D_0$ denotes a transformation pattern corresponding to the bit pattern $B_3B_2B_1B_0$, then the transformation pattern can be given by logical equations $$D_3 = \overline{B_2} \cdot B_1 \cdot B_0 + B_3 \cdot \overline{(B_2 + B_1)}$$

$$D_2 = B_2$$

$$D_1 = B_1 \cdot (B_3 + B_2 + \overline{B_0})$$

$$D_0 = B_0$$

In a like manner, when $S_A$ denotes a signal showing whether to perform a multiplication by A and $S_{A-1}$ denotes a signal showing whether to preform a multiplication by $A^{-1}$, then an operation pattern corresponding to the pattern $B_3B_3B_1B_0$ can be given by logical equations $$S_A = \overline{B_3} \cdot \overline{B_2} \cdot B_1 \cdot B_0 + B_3 \cdot B_2$$

$$S_{A-1} = B_3 \cdot B_2 \cdot \overline{B_1}$$

Also, though the registers have been used to hold values such as an exponent and an intermediate value in the modular exponentiation device of the above embodiment, the device may alternatively be equipped with a memory which is generally used for storing values.

Also, as can be understood from the flowchart in FIG. 5 and the table in FIG. 7, the invention also bears features of a modular exponentiation method that realizes the above modular exponentiation. Therefore, the invention may be implemented by a storage medium storing a program that implements the modular exponentiation method on a general-purpose computer.

Further, though the above embodiment has dealt with the modular exponentiation device and method, the same technique is applicable to an exponentiation device.

Figure 6:
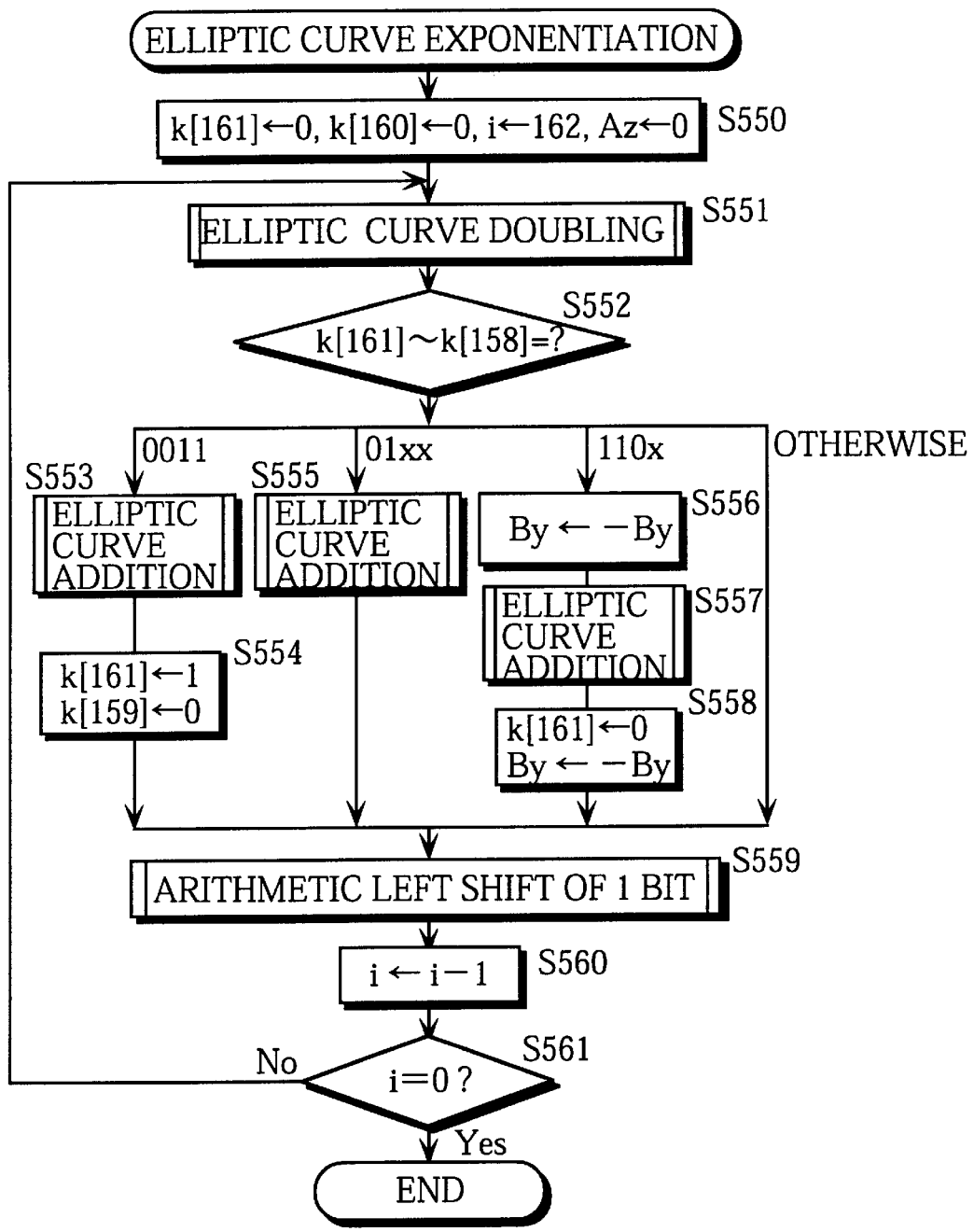
FIG. 6 is a flowchart showing the procedure of elliptic curve exponentiation according to the invention.
Figure 9:
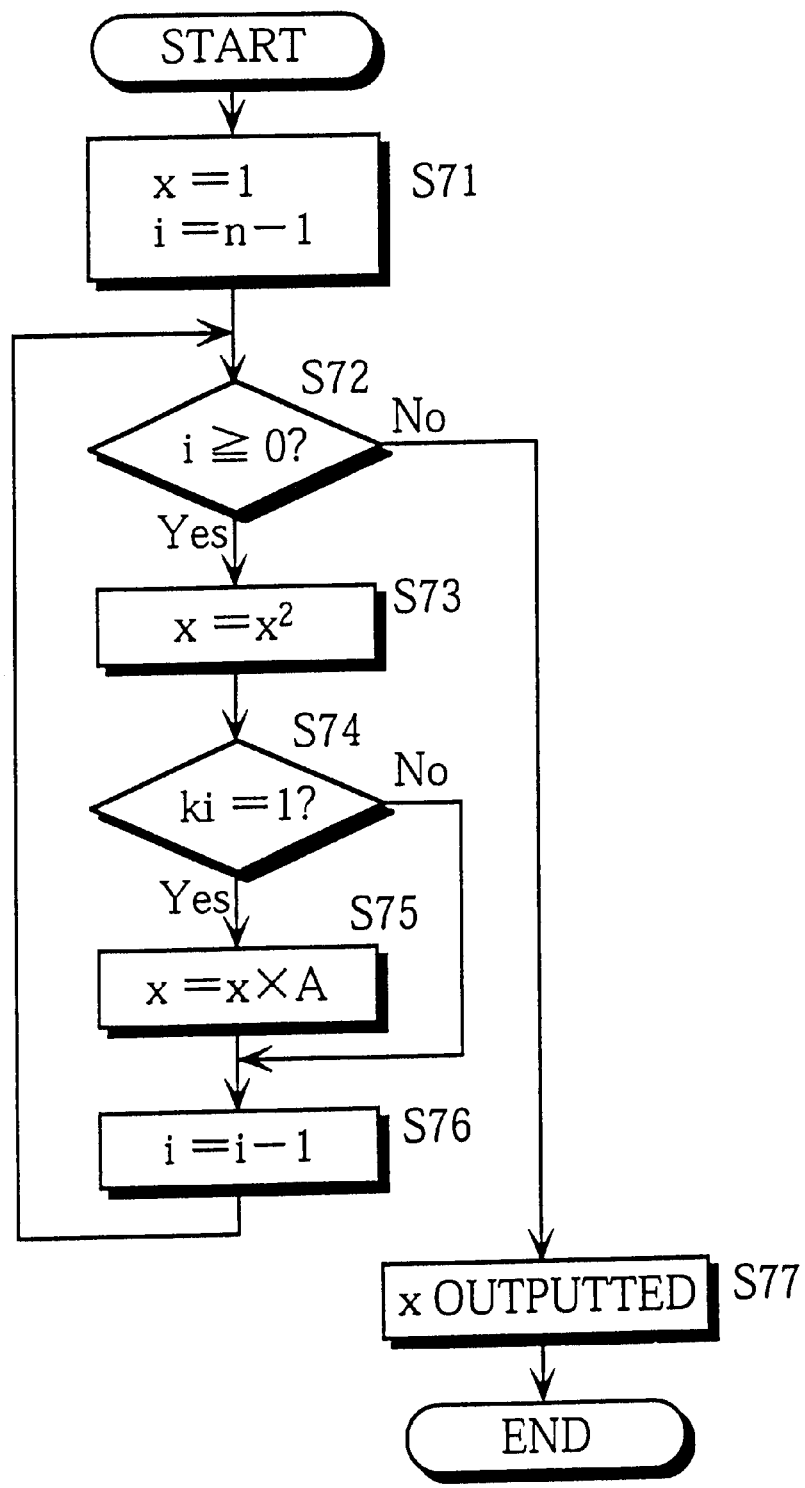
FIG. 9 is a flowchart showing the procedure of modular exponentiation according to the prior art binary method.
Figure 10:
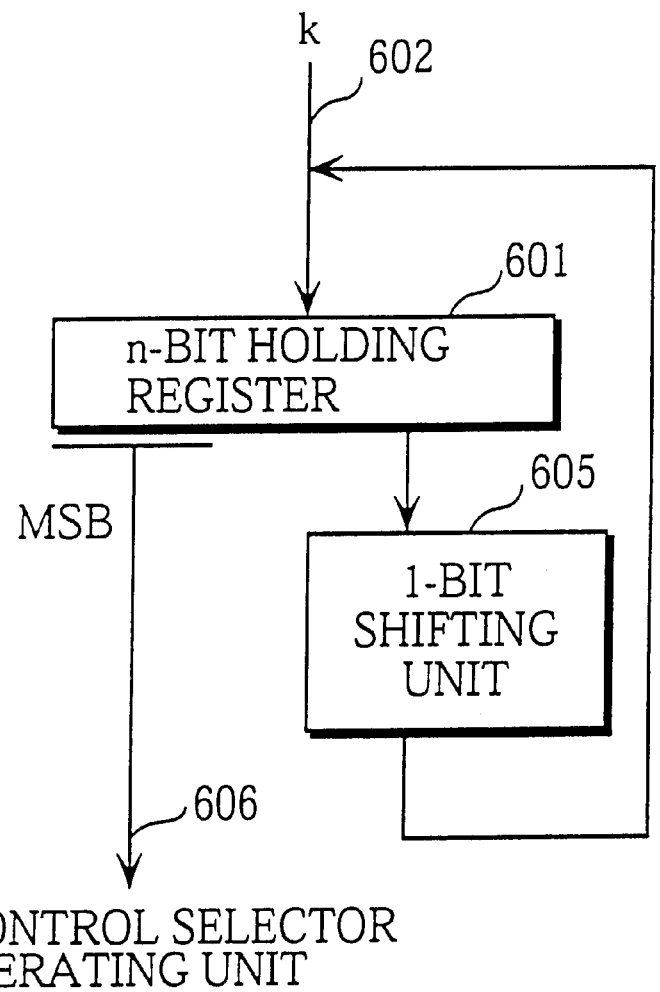
FIG. 10 shows the construction of an exponent processing unit according to the prior art binary method.
Figure 11:
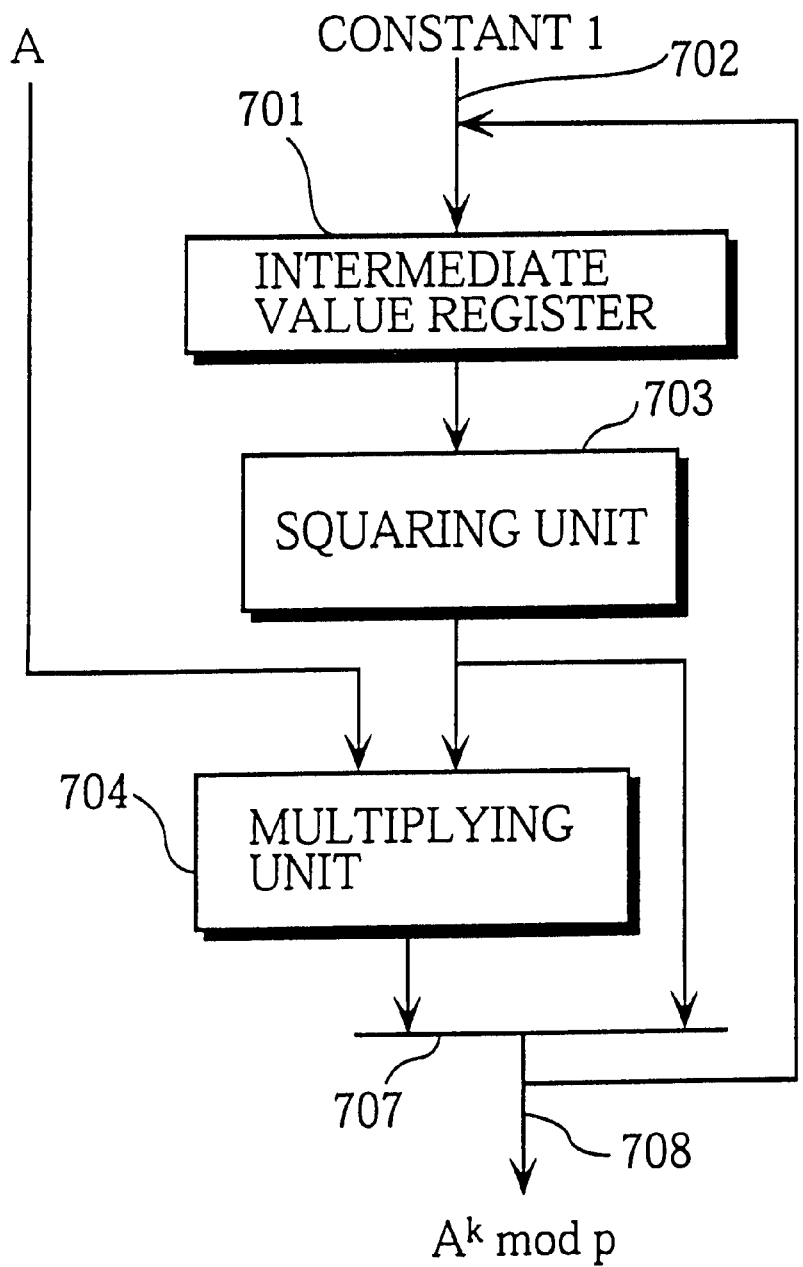
FIG. 11 shows the construction of an operating unit according to the prior art binary method.
Figure 12:
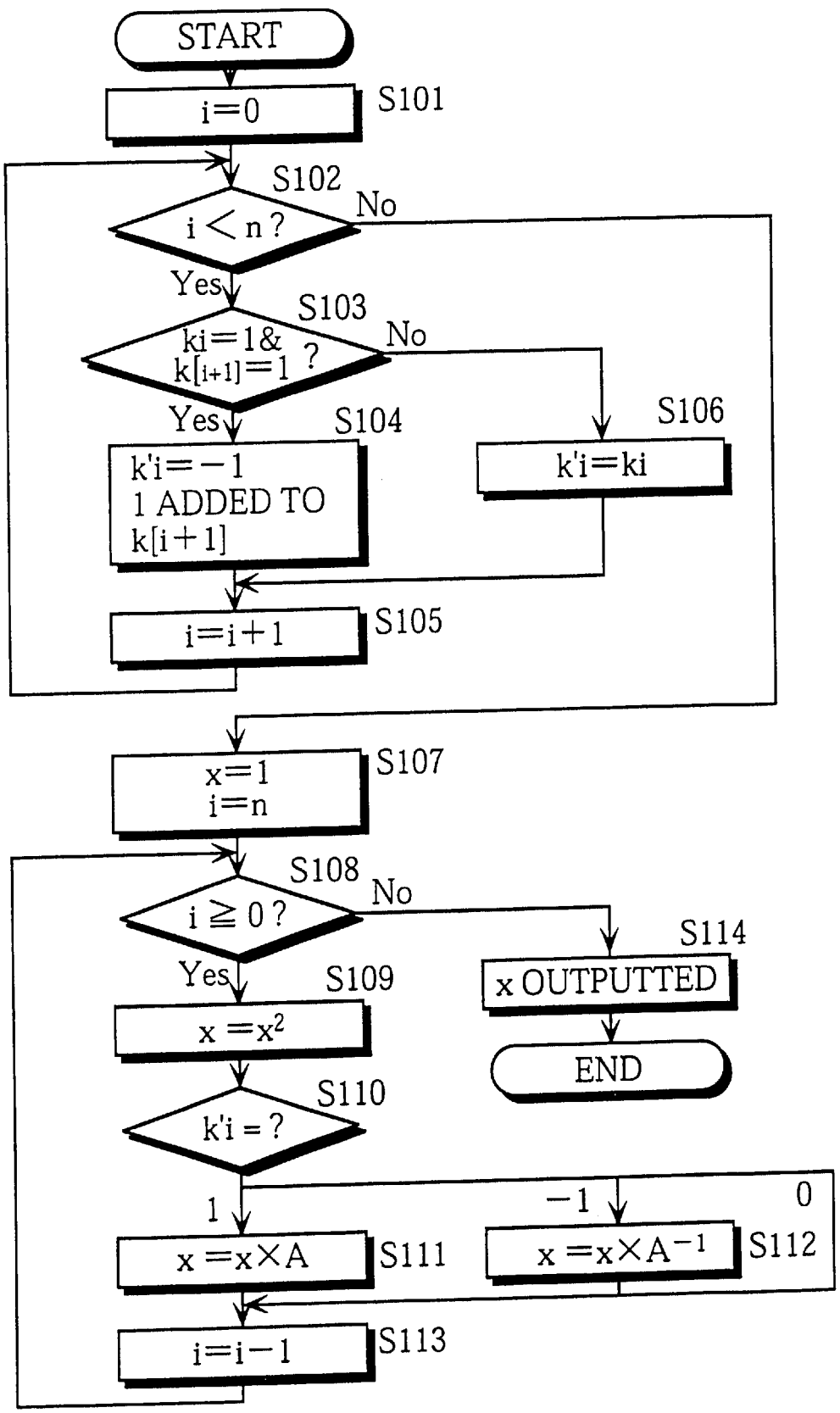
FIG. 12 is a flowchart showing the procedure of modular exponentiation according to the prior art signed binary method.
Figure 13:
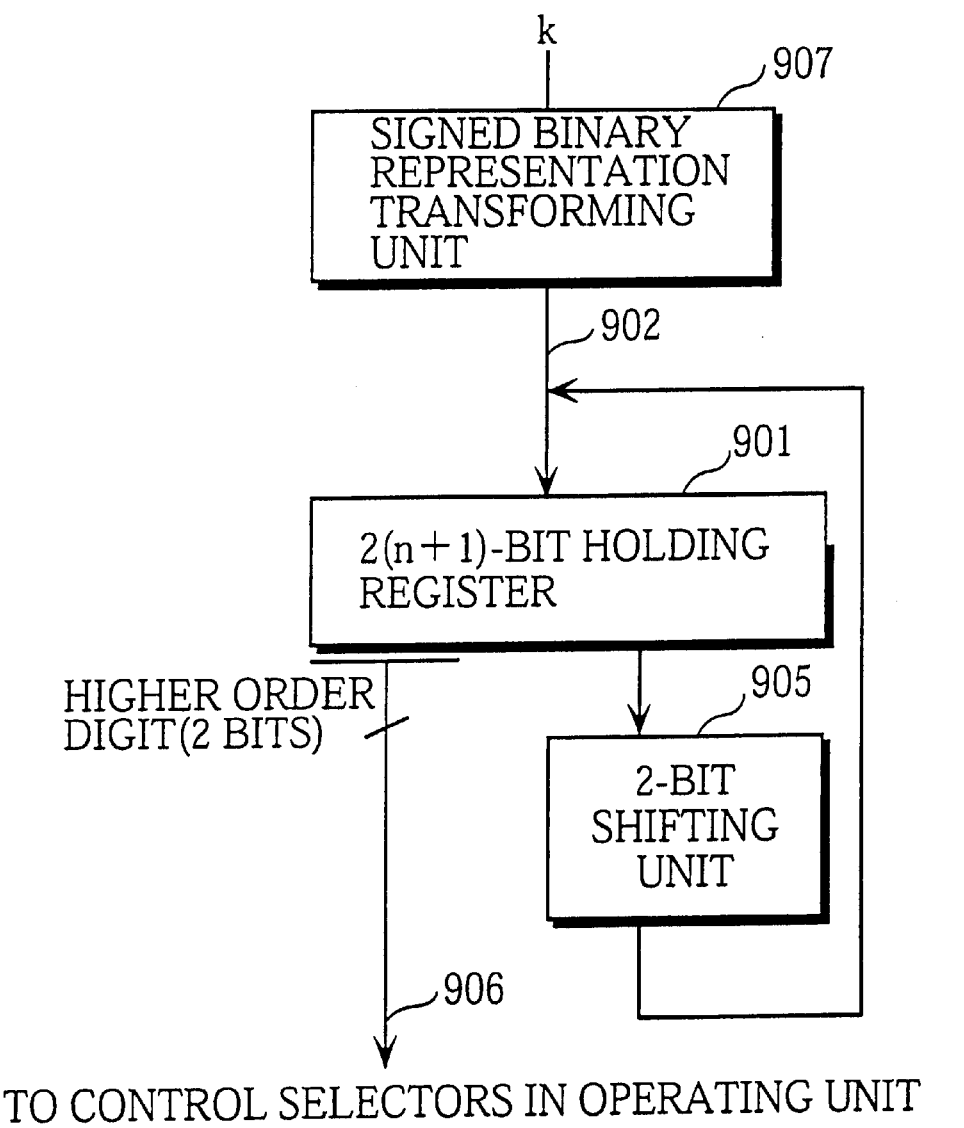
FIG. 13 shows the construction of an exponent processing unit according to the prior art signed binary method.
Figure 14:
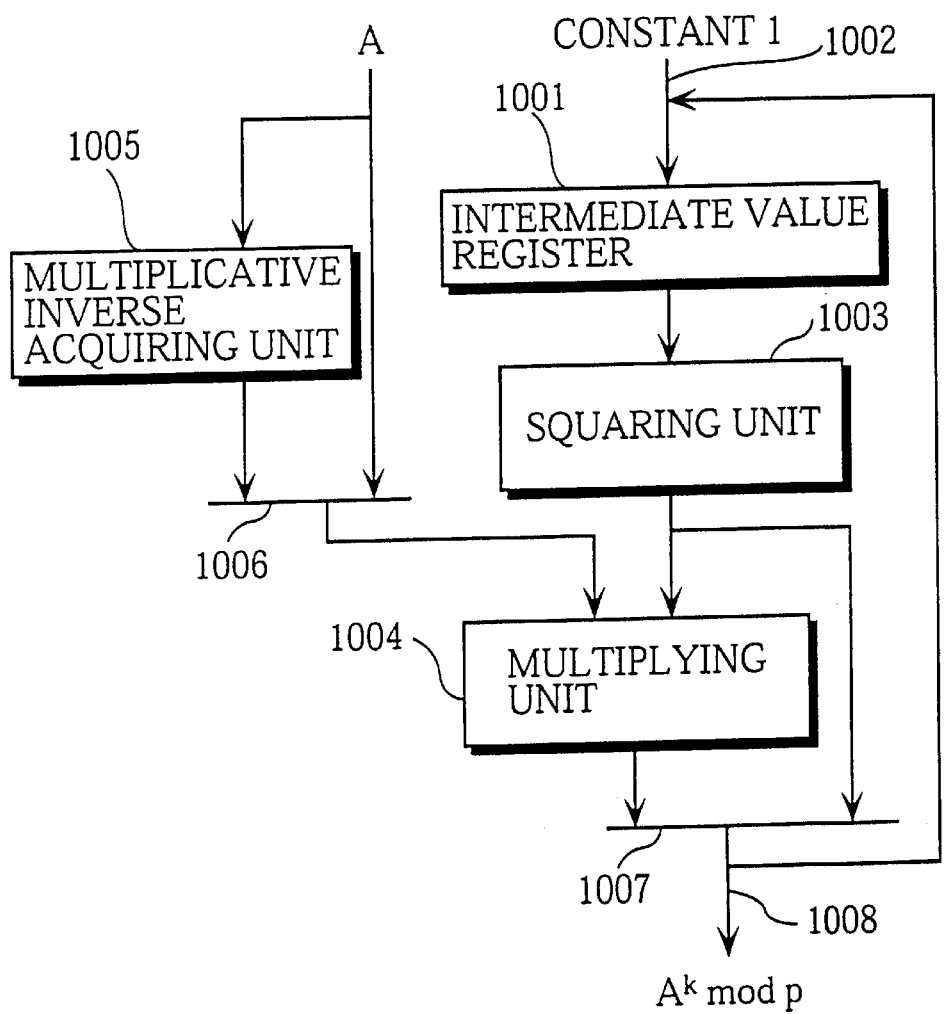
FIG. 14 shows the construction of an operating unit according to the prior art signed binary method.
Figure 15:
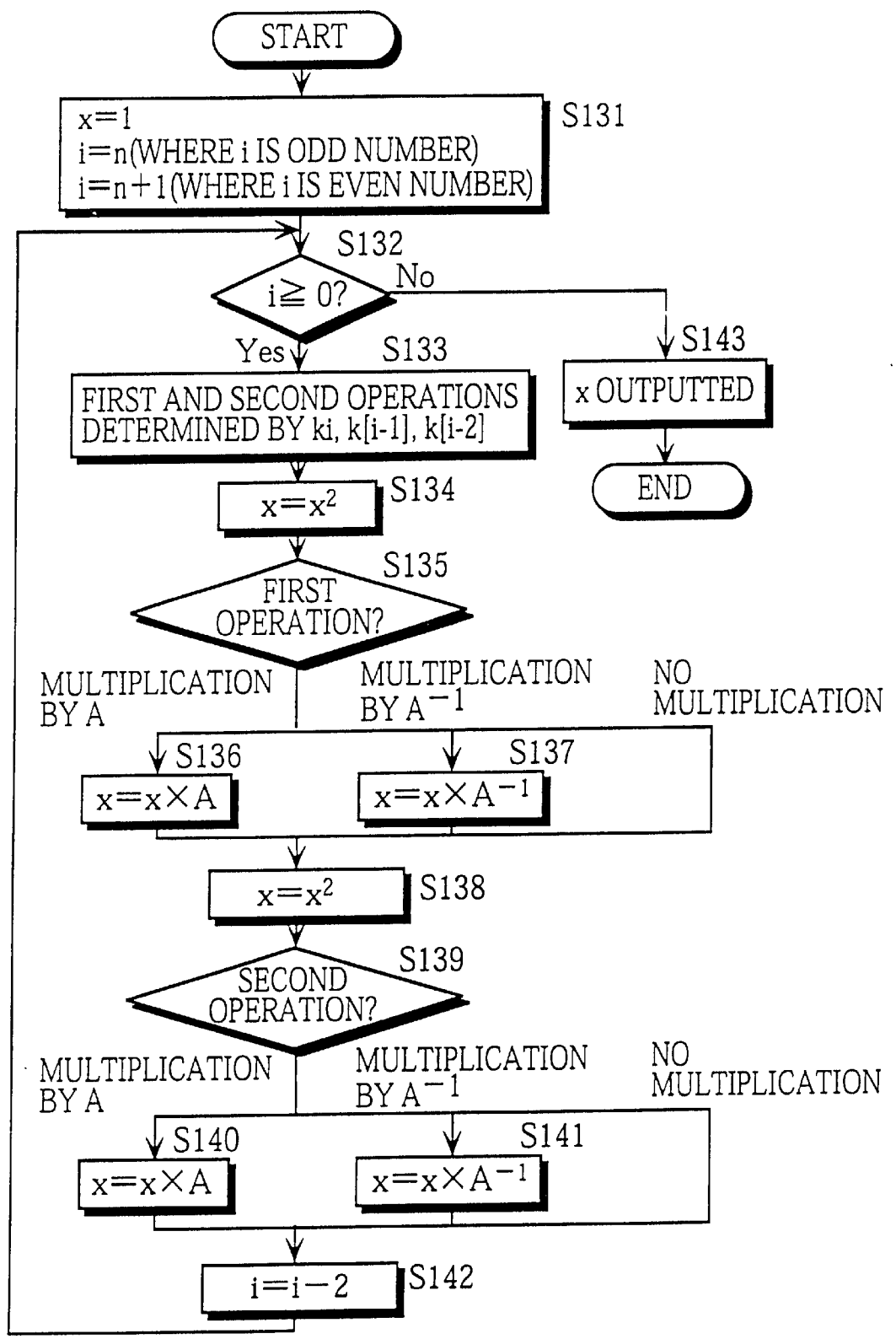
FIG. 15 is a flowchart showing the procedure of modular exponentiation according to the prior art method disclosed in Japanese Laid-Open Patent Application No. H07-049769.
Figure 16:
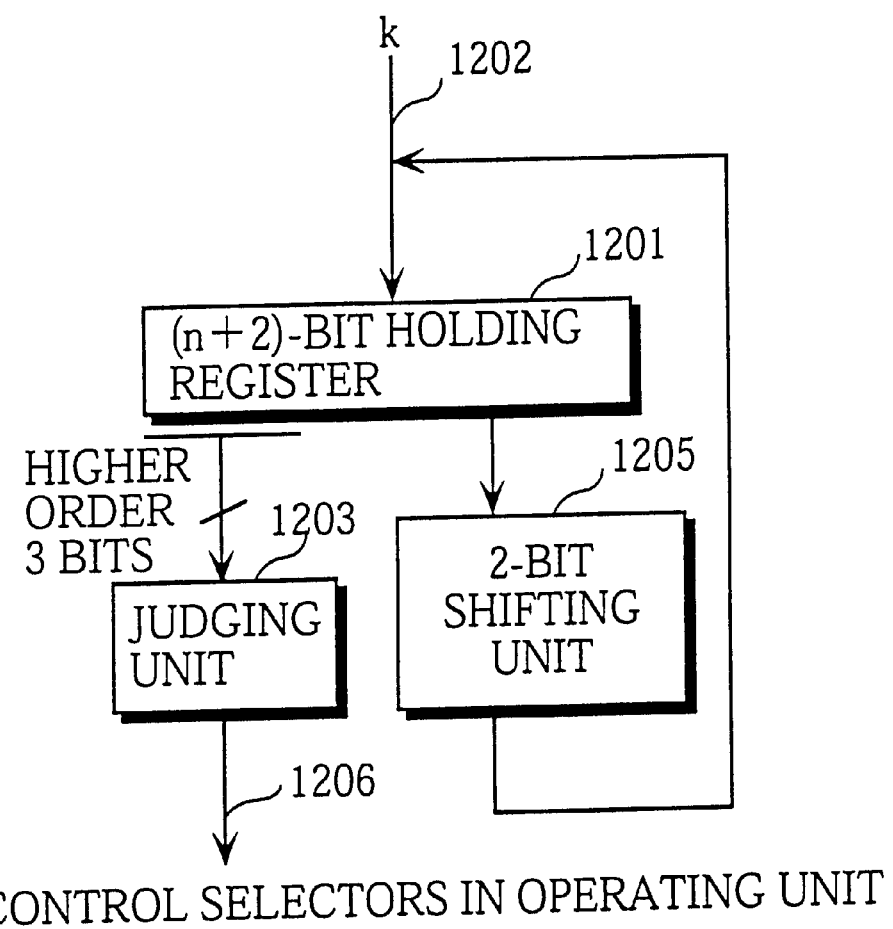
FIG. 16 shows the detailed construction of an exponent processing unit according to the prior art method disclosed in Japanese Laid-Open Patent Application No. H07-049769.

FIG. 6 is a flowchart showing the procedure when the invention is applies to an elliptic curve exponentiation device. Suppose a coefficient k of 160 bits has been stored in lower order bit positions in an 162-bit holding register beforehand, with the value of the ith bit being denoted by k[i−1]. Also, the affine coordinates of a point that is subjected to elliptic curve exponentiation have been stored respectively in registers Bx and By beforehand. In an initialization process in step S550, 0 is set in the higher order 2 bit positions in the holding register (k[161]=0, k[160]=0), i is set to 162, and a register AZ is set to 0. In a doubling process in step S551, elliptic curve doubling is performed to renew the Jacobian coordinates in registers Ax, Ay, and Az. This process is analogous to the squaring process in the above embodiment.

In step S552, a bit pattern of the higher order 4 bits is read from the holding register, in order to specify an operation pattern and a transformation pattern with reference to a table analogous to that shown in FIG. 3. Steps S553~S554, step S555, and steps S556~S558 are addition and transformation processes to be applied for the bit patterns "0011", "01xx", and "110x", respectively. Specifically, in steps S553, S555, and S557, elliptic curve addition is performed where the affine coordinates in the registers Bx and By are added to the Jacobian coordinates in the registers Ax, Ay, and Ax and the outcome is stored in the registers Ax, Ay, and Ax. Here, if Az=0, then the values of the registers Bx and By and the value 1 are respectively assigned to the registers Ax, Ay, and Az. An algorithm used in steps S553, S555, and S557 for elliptic curve addition is as follows.

Let $$s = Bx*Az^2 - Ax \quad (1)$$

$$u = By*Az^3 - Ay \quad (2)$$

From equations (1) and (2)

$$a = Ax*s^2 \quad (3)$$

$$b = s^3 + 2*a \quad (4)$$

are computed. Finally, from equations (1)–(3) the Jacobian coordinates $$Ax = u^2 - b \quad (5)$$

$$Ay = u*(a - Ax) - Ay*s^3 \quad (6)$$

$$Az = Az*s \quad (7)$$

are obtained as the elliptic curve addition result.

Meanwhile, an algorithm used in step S551 for elliptic curve doubling is as follows. From the solutions of $$a = 2*Ay^2 \quad (8)$$

$$b = 2*Ax*a \quad (9)$$

$$c = Az^4*c_1 + 3*Ax^2 \quad (10)$$

the Jacobian coordinates $$Ax' = c^2 - 2*b \quad (11)$$

$$Ay' = c*(b - Ax') - 2*a^2 \quad (12)$$

$$Az' = 2*Ay*Az \quad (13)$$

are obtained as the elliptic curve doubling result.

In equation (10), $c_1$ denotes a linear-term coefficient in an elliptic curve equation $Y^2 = X^3 + c_1 X + c_0$. Note also that there is no relation between a and b in equations (3) and (4) and a and b in equations (8) and (9).

Steps S552~S558 correspond to judgement, operation, and transformation processes of the embodiment.

In step S559, the lower order 161 bits (k[160]~k[0]) of the holding register excluding the MSB (k[161]) which is interpreted as a sign bit are shifted by 1 bit to the left. A bit that overflows as a result is abandoned. In step S560, i is decremented by 1. Here, the value of i indicates how many shifts are yet to be done. After this, steps S551~S560 are repeated until i=0 (S561).

As with the modular exponentiation device of the embodiment, the invention also bears features of an elliptic curve exponentiation method that realizes the above elliptic curve exponentiation. Therefore, the invention may be implemented by a storage medium storing a program (corresponding to the flowchart in FIG. 6) that implements the elliptic curve exponentiation method on a general-purpose computer.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An exponent preprocessing unit in an exponentiation device in which the exponent preprocessing unit preprocesses an n-bit exponent k and an operating unit exponentiates a base A by the preprocessed exponent k to compute $A^k$, the exponent preprocessing unit comprising:

bit string storing means for storing a bit string including a sign bit and the exponent k;

reading means for reading from the bit string storing means a bit pattern composed of the sign bit and a bit sequence made up of a predetermined number of bits, the predetermined number being smaller than n;

bit pattern generating means for generating a new bit pattern based on the bit pattern read by the reading means;

operation pattern specifying means for specifying an operation pattern to be applied to the base A, based on the read bit pattern;

instructing and changing means for instructing the operating unit to perform an operation according to the operation pattern specified by the operation pattern specifying means, and changing the read bit pattern to the new bit pattern and writing the new bit pattern back into the bit string storing means in bit positions from which the bit pattern was read;

read position setting means for having the reading means read a next bit sequence starting from a different bit in the bit string in the bit string storing means; and repeat controlling means for having the reading means, the bit pattern generating means, the operation pattern specifying means, the instructing and changing means, and the read position setting means sequentially repeat respective procedures thereof n+1 times.

2. The exponent preprocessing unit of claim 1, wherein the read position setting means upshifts the bit string in the bit string storing means excluding the sign bit, and wherein the bit pattern read by the reading means is composed of higher order 4 bits including the sign bit in the bit string storing means.

3. The exponent preprocessing unit of claim 2, wherein the bit pattern generating means has a table which first bit patterns in a first column are associated with second bit patterns in a second column, and searches the first column for a first bit pattern that matches at least part of the bit pattern read by the reading means, retrieves from the second column a second bit pattern which is associated with the fist bit pattern, and sets the retrieved second bit pattern as the new bit pattern.

4. The exponent preprocessing unit of claim 3, wherein the first bit patterns in the first column are a 4-bit pattern 0011, a higher order 2-bit pattern 01, and a higher order 3-bit pattern 110, wherein the 4-bit pattern 0011 in the first column is associated with a 4-bit pattern 1001 in the second column, and the higher order 3-bit pattern 110 in the first column is associated with a higher order 3-bit pattern 010 in the second column, and wherein if neither the 4-bit pattern 0011 nor the higher order 3-bit pattern 110 in the first column matches at least part of the read bit pattern, the bit pattern generating means sets the read bit pattern as the new bit pattern.

5. The exponent preprocessing unit of claim 4, wherein the table also includes a third column that shows operation patterns which are associated with the first bit patterns in the first column, and wherein if the first bit pattern that matches at least part of the read bit pattern is found, the operation pattern specifying means specifies one of the operation patterns in the third column which is associated with the first bit pattern.

6. The exponent preprocessing unit of claim 5, wherein the 4-bit pattern 0011 and the higher order 2-bit pattern 01 in the first column are both associated with an operation pattern "multiplication by the base A" in the third column, and the higher order 3-bit pattern 110 in the first column is associated with an operation pattern "multiplication by a multiplicative inverse of the base A" in the third column, and wherein if the first bit pattern that matches at least part of the read bit pattern is not found, the operation pattern specifying means specifies an operation pattern "no multiplication".

7. The exponent preprocessing unit of claim 6, wherein the bit string storing means is a register of n+2 bits whose MSB (most significant bit) is the sign bit, and the read position setting means is a shifter for left shifting the bit string in the bit string storing means excluding the MSB by 1 bit.

8. The exponent preprocessing unit of claim 2, wherein the bit pattern generating means is provided with predetermined logical equations, and generates the new bit pattern by assigning values of the 4 bits which compose the read bit pattern, to the logical equations.

9. The exponent preprocessing unit of claim 8, wherein the logical equations in the bit pattern generating means are $$D_3 = \overline{B_2} \cdot B_1 \cdot B_0 + B_3 \cdot \overline{(B_2 + B_1)}$$

$$D_2 = B_2$$

$$D_1 = B_1 \cdot (B_3 + B_2 + \overline{B_0})$$

$$D_0 = B_0$$

where $B_3$, $B_2$, $B_1$, and $B_0$ respectively denote the values of the 4 bit which compose the read bit pattern in descending order of significance, and $D_3$, $D_2$, $D_1$, and $D_0$ respectively denote values of 4 bits which compose the new bit pattern in descending order of significance.

10. The exponent preprocessing unit of claim 8, wherein the operation pattern specifying means is provided with predetermined logical equations, and specifies the operation pattern by assigning values of the 4 bits which compose the read bit pattern, to the logical equations.

11. The exponent preprocessing unit of claim 10, wherein the logical equations in the operation pattern specifying means are $$S_A = \overline{B_3} \cdot \overline{B_2} \cdot B_2 \cdot B_1 + \overline{B_3} \cdot B_2$$

$$S_{A-1} = B_3 \cdot B_2 \cdot \overline{B_1}$$

where $B_3$, $B_2$, $B_1$, and $B_0$ respectively denote the values of the 4 bits which compose the read bit pattern in descending order of significance, $S_A$ denotes a signal showing whether to perform a multiplication by the base A, and $S_{A-1}$ denotes a signal showing whether to perform a multiplication by the multiplicative inverse of the base A.

12. A preprocessing unit in an elliptic curve exponentiation device in which, when given an elliptic curve E(Fp) modulo a constant p of n bits, a positive integer k no greater than the constant p, and a point A on the elliptic curve E(Fp), the processing unit preprocesses the integer k and an operating unit performs elliptic curve exponentiation on the point A by the preprocessed integer k to compute an exponentiation point kA, the preprocessing unit comprising:

bit string storing means for storing a bit string including a sign bit and the integer k;

reading means for reading from the bit string storing means a bit pattern composed of the sign bit and a bit sequence made up of a predetermined number of bits, the predetermined number being smaller than n;

bit pattern generating means for generating a new bit pattern based on the bit pattern read by the reading means;

operation pattern specifying means for specifying an operation pattern to be applied to the point A, based on the read bit pattern;

instructing and changing means for instructing the operating unit to perform an operation according to the operation pattern specified by the operation pattern specifying means, and changing the read bit pattern to the new bit pattern and writing the new bit pattern back into the bit string storing means in bit positions from which the bit pattern was read;

read position setting means for having the reading means read a next bit sequence starting from a different bit in the bit string in the bit string storing means; and repeat controlling means for having the reading means, the bit pattern generating means, the operation pattern specifying means the instructing and changing means, and the read position setting means sequentially repeat respective procedures thereof n+1 times.

13. The preprocessing unit of claim 12, wherein the read position setting means upshifts the bit string in the bit string storing means excluding the sign bit, and wherein the bit pattern read by the reading means is composed of higher order 4 bits including the sign bit in the bit string storing means.

14. The preprocessing unit of claim 13, wherein the bit pattern generating means has a table in which first bit patterns in a first column are associated with second bit patterns in a second column, and searches the first column for a first bit pattern that matches at least part of the bit pattern read by the reading means, retrieves from the second column a second bit pattern which is associated with the first bit pattern, and sets the retrieved second bit pattern as the new bit pattern.

15. The preprocessing unit of claim 14, wherein the first bit patterns in the first column are a 4-bit pattern 0011, a higher order 2-bit pattern 01, and a higher order 3-bit pattern 110, wherein the 4-bit pattern 0011 in the first column is associated with a 4-bit pattern 1001 in the second column, and the higher order 3-bit pattern 110 in the first column is associated with a higher order 3-bit pattern 010 in the second column, and wherein if neither the 4-bit pattern 0011 nor the higher order 3-bit pattern 110 in the first column matches at least part of the read bit pattern, the bit pattern generating means sets the read bit pattern as the new bit pattern.

16. The preprocessing unit of claim 15, wherein the table also includes a third column that shows operation patterns which are associated with the first bit patterns in the first column, and wherein if the first bit pattern that matches at least part of the read bit pattern is found, the operation pattern specifying means specifies one of the operation patterns in the third column which is associated with the first bit pattern.

17. The preprocessing unit of claim 16, wherein the 4-bit pattern 0011 and the higher order 2-bit pattern 01 in the first column are both associated with an operation pattern "elliptic curve addition" in the third column, and the higher order 3-bit pattern 110 in the first column is associated with an operation pattern "elliptic curve subtraction" in the third column, and wherein if the first bit pattern that matches at least part of the read bit pattern is not found, the operation pattern specifying means specifies an operation pattern "no operation".

18. The preprocessing unit of claim 17, wherein the bit string storing means is a register of n+2 bits whose MSB (most significant bit) is the sign bit, and the read position setting means is a shifter for left shifting the bit string in the bit string storing means excluding the MSB by 1 bit.

19. The preprocessing unit of claim 13, wherein the bit pattern generating means is provided with predetermined logical equations, and generates the new bit pattern by assigning values of the 4 bits which compose the read bit pattern, to the logical equations.

20. The preprocessing unit of claim 19, wherein the logical equations in the bit pattern generating means are $$D_3 = \overline{B_2} B_1 \cdot B_0 \cdot B_3 \cdot (\overline{B_2} + B_1)$$

$$D_2 = B_2$$

$$D_1 = B_1 \cdot (B_3 + B_2 + \overline{B_0})$$

$$D_0 = B_0$$

where $B_3$, $B_2$, $B_1$, and $B_0$ respectively denote the values of the 4 bits which compose the read bit pattern in descending order of significance, and $D_3$, $D_2$, $D_1$, and $D_0$ respectively denote values of 4 bits which compose the new bit pattern in descending order of significance.

21. The preprocessing unit of claim 19, wherein the operation pattern specifying means is provided with predetermined logical equations, and specifies the operation pattern by assigning values of the 4 bits which compose the read bit pattern, to the logical equations.

22. The preprocessing unit of claim 21, wherein the logical equations in the operation pattern specifying means are $$S_A = \overline{B_3} \cdot \overline{B_2} \cdot B_1 \cdot B_0 + \overline{B_3} \cdot B_2$$

$$S_{A-1} = B_3 \cdot B_2 \cdot \overline{B_1}$$

where $B_3$, $B_2$, $B_1$, and $B_0$ respectively denote the values of the 4 bits which compose the read bit pattern in descending order of significance, $S_A$ denotes a signal showing whether to perform an elliptic curve addition, and $S_{A-1}$ denotes a signal showing whether to perform an elliptic curve subtraction.

23. An exponentiation device for computer $A^k$ using an n-bit positive integer k and an integer A, comprising:

storing means having an exponent holding area of n+1 bits, a sign holding area for holding a sign, and an intermediate value holding area for holding an intermediate value generated during the computation of $A^k$;

initializing means for initializing the storing means by setting the integer k in lower order n bit positions in the exponent holding area, a value 0 in an MSB position in the exponent holding area, a positive sign + in the sign holding area, and a constant 1 in the intermediate value holding area;

squaring means for squaring the intermediate value in the intermediate value holding area to obtain a square and replacing the intermediate value in the intermediate value holding area with the square to renew the intermediate value;

judgement object selecting means for selecting the sign in the sign holding area and 3 most significant bits in the exponent holding area, as a judgement object;

judging means for judging whether the judgement object has (a) a first pattern in which the sign in the sign holding area is the positive sign + and a bit pattern of the 3 most significant bits in the exponent holding area is 011, (b) a second pattern in which the sign in the sign holding area is the positive sign + and a 1 most significant bit in the exponent holding area is 1, (c) a third pattern in which the sign in the sign holding area is a negative sign and a bit pattern of 2 most significant bits in the exponent holding area is 10, or (d) none of the first pattern, the second pattern, and the third pattern;

multiplying means for (1) if the judgement object has any of the first pattern and the second pattern, multiplying the intermediate value in the intermediate value holding area by the integer A to obtain a product and replacing the intermediate value in the intermediate value holding area with the product to renew the intermediate value, (2) if the judgement object has the third pattern, multiplying the intermediate value in the intermediate value holding area by a multiplicative inverse of the integer A to obtain a product and replacing the intermediate value in the intermediate value holding area with the product to renew the intermediate value, and (3) if the judgement object has none of the first pattern, the second pattern, and the third pattern, maintaining the intermediate value in the intermediate value holding area intact without performing any operation;

first changing means for changing the sign in the sign holding area to the negative sign − and the bit pattern of the 3 most significant bits in the exponent holding area to 001, if the judgement object has the first pattern;

second changing means for changing the sign in the sign holding area to the positive sign +, if the judgement object has the third pattern;

shifting means for left shifting a bit string of n+1 bits held in the exponent holding area by 1 bit and abandoning any bit that overflows, after procedures required depending on a judgement result by the judging means are carried out;

outputting means for outputting the intermediate value in the intermediate value holding area as $A^k$; and controlling means for firstly having the initializing means initialize the storing means, secondly having the squaring means, the judgement object selecting means, the judging means, the multiplying means, the first changing means, the second changing means, and the shifting means sequentially repeat respective procedures thereof n+1 times, and lastly having the outputting means output the intermediate value in the intermediate value holding area as $A_k$.

24. A modular exponentiation device for computing $A^k$ mod p using an n-bit positive integer k, an integer A, and a constant p, comprising:

storing means having an exponent holding area of n+1 bits, a sign holding area for holding a sign, and an intermediate value holding area for holding an intermediate value generated during the computation of $A^k$ mod p;

initializing means for initializing the storing means by setting the integer k in lower order n bit positions in the exponent holding area, a value 0 in an MSB position in the exponent holding area, a positive sign + in the sign holding area, and a constant 1 in the intermediate value holding area;

modular squaring means for squaring the intermediate value in the intermediate value holding area modulo p to obtain a square and replacing the intermediate value in the intermediate value holding area with the square to renew the intermediate value;

judgement object selecting means for selecting the sign in the sign holding area and 3 most significant bits in the exponent holding area, as a judgement object;

judging means for judging whether the judgement object has (a) a first pattern in which the sign in the sign holding area is the positive sign + and a bit pattern of the 3 most significant bits in the exponent holding area is 011, (b) a second pattern in which the sign in the sign holding area is the positive sign + and a 1 most significant bit in the exponent holding area is 1, (c) a third pattern in which the sign in the sign holding area is a negative sign − and a bit pattern of 2 most significant bits in the exponent holding area is 10, or (d) none of the first pattern, the second pattern, and the third pattern;

modular multiplying means for (1) if the judgement object has any of the first pattern and the second pattern, multiplying the intermediate value in the intermediate value holding area by the integer A modulo p to obtain a product and replacing the intermediate value in the intermediate value holding area with the product to renew the intermediate value, (2) if the judgement object has the third pattern, multiplying the intermediate value in the intermediate value holding area by a multiplicative inverse of the integer A modulo p to obtain a product and replacing the intermediate value in the intermediate value holding area with the product to renew the intermediate value, and (3) if the judgement object has none of the first pattern, the second pattern, and the third pattern, maintaining the intermediate value in the intermediate value holding area intact without performing any operation;

first changing means for changing the sign in the sign holding area to the negative sign − and the bit pattern of the 3 most significant bits in the exponent holding area to 001, if the judgement object has the first pattern;

second changing means for changing the sign in the sign holding area to the positive sign +, if the judgement object has the third pattern;

shifting means for left shifting a bit string of n+1 bits held in the exponent holding area by 1 bit and abandoning any bit that overflows, after procedures required depending on a judgement result by the judging means are carried out;

outputting means for outputting the intermediate value in the intermediate value holding area as $A^k$ mod p; and controlling means for firstly having the initializing means initialize the storing means, secondly having the modular squaring means, the judgement object selecting means, the judging means, the modular multiplying means, the first changing means, the second changing means, and the shifting means sequentially repeat respective procedures thereof n+1 times, and lastly having the outputting means output the intermediate value in the intermediate value holding area as $A^k$ mod p.

25. An elliptic curve exponentiation device for computing an exponentiation point kA using an elliptic curve E(Fp) modulo a constant p of n bits, a positive integer k no greater than the constant p, and a point A on the elliptic curve E(Fp), comprising:

storing means having a holding area of n+1 bits, a sign holding area for holding a sign, and an intermediate point holding area for holding an intermediate point generated during the computation of the exponentiation point kA;

initializing means for initializing the storing means by setting the integer k in lower order n bit positions in the holding area, a value 0 in an MSB position in the holding area, a positive sign + in the sign holding area, and a point at infinity O in the intermediate point holding area;

elliptic curve doubling means for doubling the intermediate point in the intermediate point holding area to obtain a double point on the elliptic curve E(Fp) and replacing the intermediate point in the intermediate point holding area with the double point to renew the intermediate point;

judgement object selecting means for selecting the sign in the sign holding area and 3 most significant bits in the holding area, as a judgement object;

judging means for judging whether the judgement object has
- (a) a first pattern in which the sign in the sign holding area is the positive sign + and a bit pattern of the 3 most significant bits in the holding area is 011,
- (b) a second pattern in which the sign in the sign holding area is the positive sign + and a 1 most significant bit in the holding area is 1,
- (c) a third pattern in which the sign in the sign holding area is a negative sign − and a bit pattern of 2 most significant bits in the holding area is 10, or
- (d) none of the first pattern, the second pattern, and the third pattern, elliptic curve adding means for
- (1) if the judgement object has any of the first pattern and the second pattern, adding the point A and the intermediate point in the intermediate point holding area to obtain a sum point on the elliptic curve E(Fp) and replacing the intermediate point in the intermediate point holding area with the sum point to renew the intermediate point,
- (2) if the judgement object has the third pattern, adding an additive inverse of the point A and the intermediate point in the intermediate point holding area to obtain a sum point on the elliptic curve E(Fp) and replacing the intermediate point in the intermediate point holding area with the sum point to renew the intermediate point, and
- (3) if the judgement object has none of the first pattern, the second pattern, and the third pattern, maintaining the intermediate point in the intermediate point holding area intact without performing any operation;

first changing means for changing the sign in the sign holding area to the negative sign − and the bit pattern of the 3 most significant bits in the holding area to 001, if the judgement object has the first pattern;

second changing means for changing the sign in the sign holding area to the positive sign +, if the judgement object has the third pattern;

shifting means for left shifting a bit string of n+1 bits held in the holding area by 1 bit and abandoning any bit that overflows, after procedures required depending on a judgement result by the judging means area carried out;

outputting means for outputting the intermediate point in the intermediate point holding area as the exponentiation point kA; and controlling means for firstly having the initializing means initialize the storing means, secondly having the elliptic curve doubling means, the judgement object selecting means, the judging means, the elliptic curve adding means, the first changing means, the second changing means, and the shifting means sequentially repeat respective procedures thereof n+1 times, and lastly having the outputting means output the intermediate point in the intermediate point holding area as the exponentiation point kA.

26. An exponent preprocessing method for use in an exponentiation device that preprocesses an exponent k of n bits and exponentiates a base A by the preprocessed exponent k in an operating unit to compute $A^k$, the exponent preprocessing method comprising:

a first step for reading, from bit string storing means which stores a bit string including a sign bit and the exponent k, a bit pattern composed of the sign bit and a bit sequence made up of a predetermined number of bits, the predetermined number being smaller than n;

a second step for generating a new bit pattern based on the read bit pattern;

a third step for specifying an operation pattern to be applied to the base A, based on the read bit pattern;

a fourth step for instructing the operating unit to perform an operation according to the operation pattern specified in the third step, and changing the read bit pattern to the new bit pattern and writing the new bit pattern back into the bit string storing means in bit positions from which the bit pattern was read;

a fifth step for setting a start of a bit sequence to be read next, at a different bit in the bit string in the bit string storing means; and a sixth step for sequentially repeating the first step, the second step, the third step, the fourth step, and the fifth step n+1 times.

27. The exponent preprocessing method of claim 26, wherein the second step includes:

a substep for searching a table in which first bit patterns in a first column are associated with second bit patterns in a second column, for a first bit pattern that matches at least part of the read bit pattern, retrieving from the second column a second bit pattern which is associated with the first bit pattern, and setting the retrieved second bit pattern as the new bit pattern; and a substep for setting, if the first bit pattern that matches at least part of the read bit pattern is not found, the read bit pattern as the new bit pattern.

28. The exponent preprocessing method of claim 27, wherein the table also includes a third column that shows operation patterns which are associated with the first bit patterns in the first column, and wherein if the first bit pattern that matches at least part of the read bit pattern is found, the third step specifies one of the operation patterns in the third column which is associated with the first bit pattern.

29. The exponent preprocessing method of claim 26, wherein through use of arithmetic means storing predetermined logical equations, the second step generates the new bit pattern by assigning to the logical equations values of bits which compose the read bit pattern, and wherein through use of arithmetic means storing predetermined logical equations, the third step specifies the operation pattern by assigning to the logical equations the values of the bits which compose the read bit pattern.

30. A preprocessing method for use in an elliptic curve exponentiation device that, when given an elliptic curve E(Fp) modulo a constant p of n bits, a positive integer k no greater than the constant p, and a point A on the elliptic curve E(Fp), preprocesses the integer k and performs in an operating unit elliptic curve exponentiation on the point A by the preprocessed integer k to compute an exponentiation point kA, the preprocessing method comprising:

a first step for reading, from bit string storing means which stores a bit string including a sign bit and the integer k, a bit pattern composed of the sign bit and a bit sequence made up of a predetermined number of bits, the predetermined number being smaller than n;

a second step for generating a new bit pattern based on the read bit pattern;

a third step for specifying an operation pattern to be applied to the point A, based on the read bit pattern;

a fourth step for instructing the operating unit to perform an operation according to the operation pattern specified in the third step, and changing the read bit pattern to the new bit pattern and writing the new bit pattern back into the bit string storing means in bit positions from which the bit pattern was read;

a fifth step for setting a start of a bit sequence to be read next, at a different bit in the bit string in the bit string storing means; and a sixth step for sequentially repeating the first step, the second step, the third step, the fourth step, and the fifth step n+1 times.

31. An exponentiation method for computing $A^k$ using an n-bit positive integer k and an integer A, comprising:

a first step for initializing storing means which has an exponent holding area of n+1 bits, a sign holding area for holding a sign, and an intermediate value holding area for holding an intermediate value generated during the computation of $A^k$, by setting the integer k in lower order n bit positions in the exponent holding area, a value 0 in an MSB position in the exponent holding area, a positive sign + in the sign holding area, and a constant 1 in the intermediate value holding area;

a second step for squaring the intermediate value in the intermediate value holding area to obtain a square and replacing the intermediate value in the intermediate value holding area with the square to renew the intermediate value;

a third step for selecting the sign in the sign holding area and 3 most significant bits in the exponent holding area, as a judgement object;

a fourth step for judging whether the judgement object has
  (a) a first pattern in which the sign in the sign holding area is the positive sign + and a bit pattern of the 3 most significant bits in the exponent holding area is 011,
  (b) a second pattern in which the sign in the sign holding area is the positive sign + and a 1 most significant bit in the exponent holding area is 1,
  (c) a third pattern in which the sign in the sign holding area is a negative sign – and a bit pattern of 2 most significant bits in the exponent holding area is 10, or
  (d) none of the first pattern, the second pattern, and the third pattern;
  a fifth step for
    (1) if the judgement object has any of the first pattern and the second pattern, multiplying the intermediate value in the intermediate value holding area by the integer A to obtain a product and replacing the intermediate value in the intermediate value holding area with the product to renew the intermediate value,
    (2) if the judgement object has the third pattern, multiplying the intermediate value in the intermediate value holding area by the multiplicative inverse of the integer A to obtain a product and replacing the intermediate value in the intermediate value holding area with the product to renew the intermediate value, and
    (3) if the judgement object has none of the first pattern, the second pattern, and the third pattern, maintaining the intermediate value in the intermediate value holding area intact without performing any operation;

a sixth step for changing the sign in the sign holding area to the negative sign – and the bit pattern of the 3 most significant bits in the exponent holding area to 001, if the judgement object has the first pattern;

a seventh step for changing the sign in the sign holding area to the positive sign +, if the judgement object has the third pattern;

an eighth step for left shifting a bit string of n+1 bits held in the exponent holding area by 1 bit and abandoning any bit that overflows, after procedures required depending on a judgement result in the fourth step are carried out; and a ninth step for sequentially repeating the second step, the third step, the fourth step, the fifth step, the sixth step, the seventh step, and the eighth step until a bit which was in an LSB (least significant bit) position in the exponent holding area in the first step overflows, and outputting the intermediate value in the intermediate value holding area as $A_k$.

32. A modular exponentiation method for computing $A^k$ mod p using an n-bit positive integer k, an integer A, and a constant p, comprising:

a first step for initializing storing means which has an exponent holding area of n+1 bits, a sign holding area for holding a sign, and an intermediate value holding area for holding an intermediate value generated during the computation of $A^k$ mod p, by setting the integer k in lower order n bit positions in the exponent holding area, a value 0 in an MSB position in the exponent holding area, a positive sign + in the sign holding area, and a constant 1 in the intermediate value holding area;

a second step for squaring the intermediate value in the intermediate value holding area modulo p to obtain a square and replacing the intermediate value in the intermediate value holding area with the square to renew the intermediate value;

a third step for selecting the sign in the sign holding area and 3 most significant bits in the exponent holding area, as a judgement object;

a fourth step for judging whether the judgement object has
  (a) a first pattern in which the sign in the sign holding area is the positive sign + and a bit pattern of the 3 most significant bits in the exponent holding area is 011,
  (b) a second pattern in which the sign in the sign holding area is the positive sign + and a 1 most significant bit in the exponent holding area is 1,
  (c) a third pattern in which the sign in the sign holding area is a negative sign – and a bit pattern of 2 most significant bits in the exponent holding area is 10, or
  (d) none of the first pattern, the second pattern, and the third pattern;
  a fifth step for
    (1) if the judgement object has any of the first pattern and the second pattern, multiplying the intermediate value in the intermediate value holding area by the integer A modulo p to obtain a product and replacing the intermediate value in the intermediate value holding area with the product to renew the intermediate value,
    (2) if the judgement object has the third pattern, multiplying the intermediate value in the intermediate value holding area by a multiplicative inverse of the integer A modulo p to obtain a product and replacing the intermediate value in the intermediate value holding area with the product to renew the intermediate value, and (3) if the judgement object has none of the first pattern, the second pattern, and the third pattern, maintaining the intermediate value in the intermediate value holding area intact without performing any operation;

a sixth step for changing the sign in the sign holding area to the negative sign − and the bit pattern of the 3 most significant bits in the exponent holding area to 001, if the judgement object has the first pattern;

a seventh step for changing the sign in the sign holding area to the positive sign +, if the judgement object has the third pattern;

an eighth step for left shifting a bit string of n+1 bits held in the exponent holding area by 1 bit and abandoning any bit that overflows, after procedures required depending on a judgement result in the fourth step are carried out; and a ninth step for sequentially repeating the second step, the third step, the fourth step, the fifth step, the sixth step, the seventh step, and the eighth step until a bit which was in an LSB position in the exponent holding area in the first step overflows, and outputting the intermediate value in the intermediate value holding area as $A^k$ mod p.

33. An elliptic curve exponentiation method for computing an exponentiation point kA using an elliptic curve E(Fp) modulo a constant p of n bits, a positive integer k no greater than the constant p, and a point A on the elliptic curve E(Fp), comprising:

a first step for initializing storing means which has a holding area of n+1 bits, a sign holding area for holding a sign, and an intermediate point holding area for holding an intermediate point generated during the computation of the exponentiation point kA, by setting the integer k in lower order n bit positions in the holding area, a value 0 in an MSB position in the holding area, a positive sign + in the sign holding area, and a point at infinity O in the intermediate point holding area;

a second step for doubling the intermediate point in the intermediate point holding area to obtain a double point on the elliptic curve E(Fp) and replacing the intermediate point in the intermediate point holding area with the double point to renew the intermediate point;

a third step for selecting the sign in the sign holding area and 3 most significant bits in the holding area, as a judgement object;

a fourth step for judging whether the judgement object has
   (a) a first pattern in which the sign in the sign holding area is the positive sign + and a bit pattern of the 3 most significant bits in the holding area is 011,
   (b) a second pattern in which the sign in the sign holding area is the positive sign + and a 1 most significant bit in the holding area is 1,
   (c) a third pattern in which the sign in the sign holding area is a negative sign − and a bit pattern of 2 most significant bits in the holding area is 10, or
   (d) none of the first pattern, the second pattern, and the third pattern;

a fifth step for
   (1) if the judgement object has any of the first pattern and the second pattern, adding the point A and the intermediate point in the intermediate point holding area to obtain a sum point on the elliptic curve E(Fp) and replacing the intermediate point in the intermediate point holding area with the sum point to renew the intermediate point,
   (2) if the judgement object has the third pattern, adding an additive inverse of the point A and the intermediate point in the intermediate point holding area to obtain a sum point on the elliptic curve E(Fp) and replacing the intermediate point in the intermediate point holding area with the sum point to renew the intermediate point, and
   (3) if the judgement object has none of the first pattern, the second pattern, and the third pattern, maintaining the intermediate point in the intermediate point holding area intact without performing any operation;

a sixth step for changing the sign in the sign holding area to the negative sign − and the bit pattern of the 3 most significant bits in the holding area to 001, if the judgement object has the first pattern;

a seventh step for changing the sign in the sign holding area to the positive sign +, if the judgement object has the third pattern;

an eighth step for left shifting a bit string of n+1 bits held in the holding area by 1 bit and abandoning any bit that overflows, after procedures required depending on a judgement result in the fourth step are carried out; and a ninth step for sequentially repeating the second step, the third step, the fourth step, the fifth step, the sixth step, the seventh step, and the eighth step until a bit which was in an LSB position in the holding area in the first step overflows, and outputting the intermediate point in the intermediate point holding area as the exponentiation point kA.

34. A computer-readable storage medium storing an exponent preprocessing program for use in an exponentiation device that preprocesses an exponent k of n bits and exponentiates a base A by the preprocessed exponent k in an operating unit to compute $A^k$, the exponent preprocessing program comprising:

a first step for reading, from bit string storing means which stores a bit string including a sign bit and the exponent k, a bit pattern composed of the sign bit and a bit sequence made up of a predetermined number of bits, the predetermined number being smaller than n;

a second step for generating a new bit pattern based on the read bit pattern;

a third step for specifying an operation pattern to be applied to the base A, based on the read bit pattern;

a fourth step for instructing the operating unit to perform an operation according to the operation pattern specified in the third step, and changing the read bit pattern to the new bit pattern and writing the new bit pattern back into the bit string storing means in bit positions from which the bit pattern was read;

21 a fifth step for setting a start of a bit sequence to be read next, at a different bit in the bit string in the bit string storing means; and a sixth step for sequentially repeating the first step, the second step, the third step, the fourth step, and the fifth step n+1 times.

35. A computer-readable storage medium storing a preprocessing program for use in an elliptic curve exponentiation device that, when given an elliptic curve E(Fp) modulo a constant p of n bits, a positive integer k no greater than the constant p, and a point A on the elliptic curve E(Fp), preprocesses the integer k and performs in an operating unit elliptic curve exponentiation on the point A by the preprocessed integer k to compute an exponentiation point kA, the preprocessing program comprising:

a first step for reading, from bit string storing means which stores a bit string including a sign bit and the integer k, a bit pattern composed of the sign bit and a bit sequence made up of a predetermined number of bits, the predetermined number being smaller than n;

a second step for generating a new bit pattern based on the read bit pattern;

a third step for specifying an operation pattern to be applied to the point A, based on the read bit pattern;

a fourth step for instructing the operating unit to perform an operation according to the operation pattern specified in the third step, and changing the read bit pattern to the new bit pattern and writing the new bit pattern back into the bit string storing means in bit positions from which the bit pattern was read;

a fifth step for setting a start of a bit sequence to be read next, at a different bit in the bit string in the bit string storing means; and a sixth step for sequentially repeating the first step, the second step, the third step, the fourth step, and the fifth step n+1 times.

36. A computer-readable storage medium storing an exponentiation program for computing $A^k$ using an n-bit positive integer k and an integer A, the exponentiation program comprising:

a first step for initializing storing means which has an exponent holding area of n+1 bits, a sign holding area for holding a sign, and an intermediate value holding area for holding an intermediate value generated during the computation of $A^k$, by setting the integer k in lower order n bit positions in the exponent holding area, a value 0 in an MSB position in the exponent holding area, a positive sign + in the sign holding area, and a constant 1 in the intermediate value holding area;

a second step for squaring the intermediate value in the intermediate value holding area to obtain a square and replacing the intermediate value in the intermediate value holding area with the square to renew the intermediate value;

a third step for selecting the sign in the sign holding area and 3 most significant bits in the exponent holding area, as a judgement object;

a fourth step for judging whether the judgement object has
 (a) a first pattern in which the sign in the sign holding area is the positive sign + and a bit pattern of the 3 most significant bits in the exponent holding area is 011,
 (b) a second pattern in which the sign in the sign holding area is the positive sign + and a 1 most significant bit in the exponent holding area is 1,
 (c) a third pattern in which the sign in the sign holding area is a negative sign − and a bit pattern of 2 most significant bits in the exponent area is 10, or
 (d) none of the first pattern, the second pattern, and the third pattern;

a fifth step for
 (1) if the judgement object has any of the first pattern and the second pattern, multiplying the intermediate value in the intermediate value holding area by the integer A to obtain a product and replacing the intermediate value in the intermediate value holding area with the product to renew the intermediate value,
 (2) if the judgement object has the third pattern, multiplying the intermediate value in the intermediate value holding area by a multiplicative inverse of the integer A to obtain a product and replacing the intermediate value in the intermediate value holding area with the product to renew the intermediate value, and
 (3) if the judgement object has none of the first pattern, the second pattern, and the third pattern, maintaining the intermediate value in the intermediate value holding area intact without performing any operation;

a sixth step for changing the sign in the sign holding area to the negative sign − and the bit pattern of the 3 most significant bits in the exponent holding area to 001, if the judgement object has the first pattern;

a seventh step for changing the sign in the sign holding area to the positive sign +, if the judgement object has the third pattern;

an eighth step for left shifting a bit string of n+1 bits held in the exponent holding area by 1 bit and abandoning any bit that overflows, after procedures required depending on a judgement result in the fourth step are carried out; and a ninth step for sequentially repeating the second step, the third step, the fourth step, the fifth step, the sixth step, the seventh step, and the eighth step until a bit which was in an LSB position in the exponent holding area in the first step overflows, and outputting the intermediate value in the intermediate value holding area as $A^k$.

37. A computer-readable storage medium storing a modular exponentiation program for computing $A^k$ mod p using an n-bit positive integer k, an integer A, and a constant p, the modular exponentiation program comprising:

a first step for initializing storing means which has an exponent holding area of n+1 bits, a sign holding area for holding a sign, and an intermediate value holding area for holding an intermediate value generated during the computation of $A^k$ mod p, by setting the integer k in lower order n bit positions in the exponent holding area, a value 0 in an MSB position in the exponent holding area, a positive sign + in the sign holding area, and a constant 1 in the intermediate value holding area;

a second step for squaring the intermediate value in the intermediate value holding area modulo p to obtain a square and replacing the intermediate value in the intermediate value holding area with the square to renew the intermediate value;

a third step for selecting the sign in the sign holding area and 3 most significant bits in the exponent holding area, as a judgement object;

a fourth step for judging whether the judgement object has
 (a) a first pattern in which the sign in the sign holding area is the positive sign + and a bit pattern of the most significant 3 bits in the exponent holding area is 011,
 (b) a second pattern in which the sign in the sign holding area is the positive sign + and a 1 most significant bit in the exponent holding area is 1,
 (c) a third pattern in which the sign in the sign holding area is a negative sign − and a bit pattern of 2 most significant bits in the exponent holding area is 10, or
 (d) none of the first pattern, the second pattern, and the third pattern;

a fifth step for
 (1) if the judgement object has any of the first pattern and the second pattern, multiplying the intermediate value in the intermediate value holding area by the integer A modulo p to obtain a product and replacing the intermediate value in the intermediate value holding area with the product to renew the intermediate value, (2) if the judgement object has the third pattern, multiplying the intermediate value in the intermediate value holding area by a multiplicative inverse of the integer A modulo p to obtain a product and replacing the intermediate value in the intermediate value holding area with the product to renew the intermediate value, and (3) if the judgement object has none of the first pattern, the second pattern, and the third pattern, maintaining the intermediate value in the intermediate value holding area intact without performing any operation;

a sixth step for changing the sign in the sign holding area to the negative sign − and the bit pattern of the 3 most significant bits in the exponent holding area to 001, if the judgement object has the first pattern;

a seventh step for changing the sign in the sign holding area to the positive sign +, if the judgement object has the third pattern;

an eighth step for left shifting a bit string of n+1 bits held in the exponent holding area by 1 bit and abandoning any bit that overflows, after procedures required depending on a judgement result in the fourth step are carried out; and a ninth step for sequentially repeating the second step, the third step, the fourth step, the fifth step, the sixth step, the seventh step, and the eighth step until a bit which was in an LSB position in the exponent holding area in the first step overflows, and outputting the intermediate value in the intermediate value holding area as $A^k$ mod p.

38. A computer-readable storage medium storing an elliptic curve exponentiation program for computing an exponentiation point kA using an elliptic curve E(Fp) modulo a constant p of n bits, a positive integer k no greater than the constant p, and a point A on the elliptic curve E(Fp), the elliptic curve exponentiation program comprising:

a first step for initializing storing means which has a holding area of n+1 bits, a sign holding area for holding a sign, and an intermediate point holding area for holding an intermediate point generated during the computation of the exponentiation point kA, by setting the integer k in lower order n bit positions in the holding area, a value 0 in an MSB position in the holding area, a positive sign + in the sign holding area, and a point at infinity O in the intermediate point holding area;

a second step for doubling the intermediate point in the intermediate point holding area to obtain a double point on the elliptic curve E(Fp) and replacing the intermediate point in the intermediate point holding area with the double point to renew the intermediate point;

a third step for selecting the sign in the sign holding area and 3 most significant bits in the holding area, as a judgement object;

a fourth step for judging whether the judgement object has (a) a first pattern in which the sign in the sign holding area is the positive sign + and a bit pattern of the 3 most significant bits in the holding area is 011, (b) a second pattern in which the sign in the sign holding area is the positive sign + and a 1 most significant bit in the holding area is 1, (c) a third pattern in which the sign in the sign holding area is a negative sign − and a bit pattern of 2 most significant bits in the holding area is 10, or (d) none of the first pattern, the second pattern, and the third pattern;

a fifth step for (1) if the judgement has any of the first pattern and the second pattern, adding the point A and the intermediate point in the intermediate point holding area to obtain a sum point on the elliptic curve E(Fp) and replacing the intermediate point in the intermediate point holding area with the sum point to renew the intermediate point, (2) if the judgement object has the third pattern, adding an additive inverse of the point A and the intermediate point in the intermediate point holding area to obtain a sum point on the elliptic curve E(Fp) and replacing the intermediate point in the intermediate point holding area with the sum point to renew the intermediate point, and (3) if the judgement object has none of the first pattern, the second pattern, and the third pattern, maintaining the intermediate point in the intermediate point holding area intact without performing any operation;

a sixth step for changing the sign in the sign holding area to the negative sign − and the bit pattern of the 3 most significant bits in the holding area to 001, if the judgement object has the first pattern;

a seventh step for changing the sign in the sign holding area to the positive sign +, if the judgement object has the third pattern;

an eighth step for left shifting a bit string of n+1 bits held in the holding area by 1 bit and abandoning any bit that overflows, after procedures required depending on a judgement result in the fourth step are carried out; and a ninth step for sequentially repeating the second step, the third step, the fourth step, the fifth step, the sixth step, the seventh step, and the eighth step until a bit which was in an LSB position in the holding area in the first step overflows, and outputting the intermediate point in the intermediate point holding area as the exponentiation point kA.

* * * * *

UNITED STATES PATENT AND TRADEMARK OFFICE
CERTIFICATE OF CORRECTION

PATENT NO. : 6,567,832 B1
DATED : May 20, 2003
INVENTOR(S) : Ono et al.

It is certified that error appears in the above-identified patent and that said Letters Patent is hereby corrected as shown below:

Column 19,
Line 30, after the word "as" delete "Ak" and insert -- $A_k$ --

Column 24,
Line 19, after the word "as" delete "Ak" and insert -- $A_k$ --.

Signed and Sealed this

Twenty-sixth Day of October, 2004

JON W. DUDAS
*Director of the United States Patent and Trademark Office*